United States Patent
Furuta et al.

(10) Patent No.: US 9,442,901 B2
(45) Date of Patent: Sep. 13, 2016

(54) RESEMBLING CHARACTER DATA SEARCH SUPPORTING METHOD, RESEMBLING CANDIDATE EXTRACTING METHOD, AND RESEMBLING CANDIDATE EXTRACTING APPARATUS

(75) Inventors: Takashi Furuta, Kawasaki (JP); Isamu Ooishi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 232 days.

(21) Appl. No.: 13/429,491

(22) Filed: Mar. 26, 2012

(65) Prior Publication Data

US 2012/0278356 A1    Nov. 1, 2012

(30) Foreign Application Priority Data

Apr. 28, 2011   (JP) ................. 2011-102207

(51) Int. Cl.
  *G06F 17/30* (2006.01)
  *G06F 7/00* (2006.01)
  *G06F 17/22* (2006.01)

(52) U.S. Cl.
  CPC ................. *G06F 17/2223* (2013.01)

(58) Field of Classification Search
  CPC .......................................... G06F 17/2211
  USPC ........................................... 707/769
  See application file for complete search history.

(56) References Cited

U.S. PATENT DOCUMENTS

| | | | | |
|---|---|---|---|---|
| 5,034,991 A * | 7/1991 | Hagimae | ............ | G06K 9/3283 382/171 |
| 5,123,057 A * | 6/1992 | Verly | ................... | G06K 9/3241 382/156 |
| 5,577,249 A * | 11/1996 | Califano | ........... | G06F 17/30985 382/209 |
| 5,819,291 A * | 10/1998 | Haimowitz | ....... | G06F 17/30949 707/999.001 |
| 6,009,424 A | 12/1999 | Lepage et al. | | |
| 6,091,844 A * | 7/2000 | Fujii | ........................ | G06K 9/32 382/135 |
| 6,985,926 B1 * | 1/2006 | Ferlauto | ............ | G06F 17/30303 707/999.006 |
| 7,154,538 B1 * | 12/2006 | Fukasawa | .............. | H04M 11/04 348/211.3 |
| 8,121,989 B1 * | 2/2012 | Gengelbach | ........ | G06F 17/2211 707/695 |
| 2003/0182296 A1 | 9/2003 | Sato et al. | | |
| 2004/0220918 A1 * | 11/2004 | Scriffignano | ...... | G06F 17/30424 707/999.003 |
| 2005/0010863 A1 * | 1/2005 | Zernik | .......................... | 715/511 |

(Continued)

FOREIGN PATENT DOCUMENTS

| | | |
|---|---|---|
| JP | 2-032455 A | 2/1990 |
| JP | 6-325091 A | 11/1994 |

(Continued)

OTHER PUBLICATIONS

Japanese Office Action mailed Jul. 1, 2014 for corresponding Japanese Patent Application 2011-102207, with English Translation, 10 pages.

(Continued)

*Primary Examiner* — Pavan Mamillapalli
(74) *Attorney, Agent, or Firm* — Fujitsu Patent Center

(57) ABSTRACT

From among a plurality of character code groups, a resemblance determining apparatus searches for a character code group resembling a character code group specified by the user. At that time, when each character code included in the specified character code group is within a predetermined numerical range, the resemblance determining apparatus excludes character code groups having character codes outside of the predetermined numerical range and extracts the remaining character code groups.

8 Claims, 14 Drawing Sheets

(56) References Cited

U.S. PATENT DOCUMENTS

| | | | |
|---|---|---|---|
| 2005/0240615 A1* | 10/2005 | Barsness et al. | 707/102 |
| 2006/0080299 A1 | 4/2006 | Shimogori et al. | |
| 2008/0046468 A1* | 2/2008 | Salwan et al. | 707/104.1 |

FOREIGN PATENT DOCUMENTS

| | | | |
|---|---|---|---|
| JP | 7-129554 A | 5/1995 | |
| JP | 10-134085 A | 5/1998 | |
| JP | 11-39344 A | 2/1999 | |
| JP | 11-143902 A | 5/1999 | |
| JP | 2001-067378 A | 3/2001 | |
| JP | 2003-271656 A | 9/2003 | |
| JP | 2004-227037 A | 8/2004 | |
| JP | 2006-99236 A | 4/2006 | |
| JP | 2008-181459 A | 8/2008 | |
| WO | 2007/132564 A1 | 11/2007 | |

OTHER PUBLICATIONS

Tsunoda, Tatsuhiko et al., "Automatic Alignment between TV News and Newspaper Articles by String Matching between Captions and Article Texts," Transactions of Information Processing Society of Japan, Information processing Society of Japan, Jun. 15, 1997, vol. 38, No .6, pp. 1149-1162, with Partial English Translation.

Japanese Office Action mailed Mar. 3, 2015 for corresponding Japanese Patent Application No. 2011-102207 with Partial English Translation, 4 pages.

Japanese Office Action mailed Sep. 8, 2015 for corresponding Japanese Patent Application No. 2011-102207, with Partial English Translation, 4 pages.

\* cited by examiner

FIG.4

| CHARACTER CODE GROUP | CODE RANGE (EX. SHIFT JIS) | #1 SYMBOL | #2 NUMERICAL VALUE | #3 IDENTIFIER | #4 KANA | #5 JAPANESE | #6 RUSSIAN | #7 GREEK | #8 UNDEFINED |
|---|---|---|---|---|---|---|---|---|---|
| ONE-BYTE CONTROL CHARACTERS | 0x00 TO 0x1F | | | | | | | | ○ |
| ONE-BYTE SYMBOLS | 0x21 TO 0x2F | ○ | ○ | | ○ | ○ | ○ | ○ | ○ |
| ONE-BYTE NUMBERS | 0x30 TO 0x39 | | ○ | | ○ | ○ | ○ | ○ | ○ |
| ONE-BYTE ENGLISH CAPITAL LETTERS | 0x41 TO 0x5A | | | ○ | ○ | ○ | ○ | ○ | ○ |
| ONE-BYTE ENGLISH LOWERCASE LETTERS | 0x61 TO 0x7A | | | ○ | ○ | ○ | ○ | ○ | ○ |
| ONE-BYTE KATAKANA | 0xA1 TO 0xDF | | | | ○ | ○ | | | ○ |
| DOUBLE-BYTE SYMBOLS | 0x8140 TO 0x81FC | | ○ | ○ | ○ | ○ | | | ○ |
| DOUBLE-BYTE NUMBERS | 0x8250 TO 0x825B | | ○ | ○ | ○ | ○ | | | ○ |
| DOUBLE-BYTE ENGLISH CAPITAL LETTERS | 0x8260 TO 0x8279 | | | ○ | ○ | ○ | | | ○ |
| DOUBLE-BYTE ENGLISH LOWERCASE LETTERS | 0x8280 TO 0x829A | | | ○ | ○ | ○ | | | ○ |
| DOUBLE-BYTE KATAKANA | 0x8340 TO 0x8396 | | | | ○ | ○ | | | ○ |
| DOUBLE-BYTE HIRAGANA | 0x829F TO 0x82F1 | | | | ○ | ○ | | | ○ |
| DOUBLE-BYTE KANJI | 0x8140 TO 0xA0FC | | | | | ○ | | | ○ |
| CYRILLIC ALPHABETS | | | | | | | ○ | | ○ |
| GREEK ALPHABETS | | | | | | | | ○ | ○ |
| DOUBLE-BYTE OTHER | OTHER THAN ABOVE | | | | | | | | ○ |

FIG.5

| CROSSCHECKING ITEM | CROSSCHECKING METHOD | WEIGHTING |
|---|---|---|
| ITEM NAME | EDIT DISTANCE | 10 |
| MAXIMUM LENGTH | COMMON LOGARITHM | 2 |
| AVERAGE LENGTH | COMMON LOGARITHM | 3 |
| DATA TYPE | STRING MATCHING | 9 |
| NULL PROBABILITY | COMMON LOGARITHM | 1 |
| UNIQUE COUNT | IGNORE | 0 |
| DEGREE OF DISCRETION | COMMON LOGARITHM | 1 |

FIG.6

| PRICE | DEVICE TYPE | MODEL NUMBER | SELLING DATE |
|---|---|---|---|
| 98,000 | 冷蔵庫 | GAH2000 | 12/16/2009 |
| 2,800 | イヤフォン | HSZ-1000 | 12/21/2009 |
| 24,800 | シェーバー | QA87913 | 12/22/2009 |
| 980 | 充電池 | A3-7Z19 | 1/5/2010 |
| 18,800 | ゲーム機 | X2AZ4000 | 3/25/2010 |

FIG.7

| DATE OF PURCHASE | MODEL NUMBER | PRODUCT CLASS | QUANTITY |
|---|---|---|---|
| 12/1/2009 | FSX7878 | 掃除機 | 20 |
| 12/8/2009 | TZ12-328 | パソコン | 5 |
| 12/15/2009 | 32Z294GY | エアコン | 25 |
| 12/22/2009 | HSZ-1000 | イヤフォン | 10 |

FIG.8

| ITEM NAME | PRICE | DEVICE TYPE | MODEL NUMBER | SELLING DATE |
|---|---|---|---|---|
| MAXIMUM LENGTH | 6 | 10 | 8 | 10 |
| AVERAGE LENGTH | 5 | 8 | 7 | 9 |
| DATA TYPE | NUMERICAL VALUE | JAPANESE | IDENTIFIER | NUMERICAL VALUE |
| NULL PROBABILITY | 0 | 0 | 0 | 0 |
| UNIQUE COUNT | 5 | 5 | 5 | 5 |
| DEGREE OF DISCRETION | 100 | 100 | 100 | 100 |

FIG.9

| ITEM NAME | DATE OF PURCHASE | MODEL NUMBER | PRODUCT CLASS | QUANTITY |
|---|---|---|---|---|
| MAXIMUM LENGTH | 10 | 8 | 10 | 2 |
| AVERAGE LENGTH | 9 | 7 | 8 | 1 |
| DATA TYPE | NUMERICAL VALUE | IDENTIFIER | JAPANESE | NUMERICAL VALUE |
| NULL PROBABILITY | 0 | 0 | 0 | 0 |
| UNIQUE COUNT | 4 | 4 | 4 | 4 |
| DEGREE OF DISCRETION | 100 | 100 | 100 | 100 |

FIG.10

| ITEM "TYPE" \ ITEM | DATE OF PURCHASE | MODEL NUMBER | PRODUCT CLASS | QUANTITY |
|---|---|---|---|---|
| ITEM NAME COINCIDENCE DEGREE | 0 | 0 | 0.25 | 0 |
| CLOSENESS OF MAXIMUM LENGTH | 1 | 0.90 | 1 | 0.30 |
| CLOSENESS OF AVERAGE LENGTH | 0.95 | 0.94 | 1 | 0.10 |
| DATA TYPE MATCHING | 0 | 0 | 1 | 0 |
| NULL PROBABILITY | 1 | 1 | 1 | 1 |
| UNIQUE COUNT | 0 | 0 | 0 | 0 |
| DEGREE OF DISCRETION | 1 | 1 | 1 | 1 |
| DEGREE OF RESEMBLANCE | 0.263 | 0.255 | 0.712 | 0.111 |

FIG.11

| ITEM | COMMON CANDIDATE 1 (DEGREE OF RESEMBLANCE) | COMMON CANDIDATE 2 (DEGREE OF RESEMBLANCE) | ... |
|---|---|---|---|
| DEVICE TYPE | PRODUCT CLASS (0.712) | - | ... |
| PRICE | QUANTITY (0.665) | DATE OF PURCHASE (0.542) | ... |
| ... | ... | ... | ... |

RESEMBLING CHARACTER DATA SEARCH SUPPORTING METHOD, RESEMBLING CANDIDATE EXTRACTING METHOD, AND RESEMBLING CANDIDATE EXTRACTING APPARATUS

CROSS-REFERENCE TO RELATED APPLICATIONS

This application is based upon and claims the benefit of priority of the prior Japanese Patent Application No. 2011-102207, filed on Apr. 28, 2011, the entire contents of which are incorporated herein by reference.

FIELD

The embodiments discussed herein are directed to a resembling character-code-group search supporting method, a resembling candidate extracting method, a resembling candidate extracting program, and a resembling candidate extracting apparatus.

BACKGROUND

Typically, while generating a new database by means of integrating a plurality of databases, a name identification operation is performed. In the name identification operation, resemblance is determined among data items in the databases to be integrated; resembling data items are extracted; and common data items are decided from the extracted data items.

As a specific example, degrees of resemblance are calculated among data items in the sets of master data stored in a plurality of systems such as a bookkeeping system, a customer system, and a delivery system. Then, the data items having a high degree of resemblance are extracted.

As a method of determining the resemblance among data items, either the visual judgment of an operator can be used or automated estimation can be implemented. For example, when the visual judgment of an operator is used, the operator identifies resembling data items by referring to the explanation of data items given in the design specification of each database. Accordingly, the operator determines that, for example, a data item "order receiving entity" stored in a database A resembles to a data item "valued customer" stored in a database B.

When automated estimation is implemented, degrees of resemblance are calculated while sampling the data items, and resembling data items are identified according to the degrees of resemblance. For example, the degrees of resemblance are calculated using the string lengths of attribute values associated with the data items, or using the frequency of appearance of special strings appearing in the data items or in the attribute values, or using the number of partial strings in common.

Patent Literature 1: Japanese Laid-open Patent Publication No. 2003-271656
Patent Literature 2: Japanese Laid-open Patent Publication No. 11-143902
Patent Literature 3: Japanese Laid-open Patent Publication No. 06-325091
Patent Literature 4: Japanese Laid-open Patent Publication No. 2001-067378

However, even after implementing the conventional technology, depending on the number of data items or depending on the result of calculating the degrees of resemblance among the data items, it may take a lot of processing time to determine resembling candidates.

For example, when the visual judgment is used, since the data items stored across databases are generally named in a varied manner, it is often difficult to determine the resemblance only by referring to the data item names written in the design specification. Moreover, in past systems, the design specification of databases is often not maintained; or even if the design specifications are maintained, the updated portion may not be reflected therein. In such cases, the operator has to determine the resemblance by checking the attribute values of data items, that is, by checking the data itself. That task takes an immense amount of time in case the number of data items is large.

During automated estimation, calculation is done regarding combinations of data items. Hence, if there are a large number of data items or if resembling items are not narrowed down in advance, automated estimation takes a lot of time for the calculation. For example, if there are 100,000 data items, then the resemblance needs to be calculated for 100000×100000/2=5000000000 (5 billion) times, which is not a realistic task.

Moreover, during automated estimation, data items having a high degree of resemblance are extracted as data items that are likely to be integrated. That is, on the other hand, data items having a low degree of resemblance are automatically left out of consideration. Hence, regarding such data items which although have a low degree of resemblance but still are targets for integration due to a high degree of relevancy, eventually the method of using visual judgment needs to be implemented.

SUMMARY

According to an aspect of an embodiment of the invention, a resembling character-code-group search supporting method includes, identifying a first character code group that includes character codes outside of a predetermined numerical range, while searching for a resembling character code group resembling a specified character code group from among a plurality of character code groups and when each character code included in the specified character code group is within the predetermined numerical range, and extracting a second character code group excluding the first character code group from among the plurality of character code groups.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram illustrating an exemplary correspondence table stored in a correspondence table DB;

FIG. 5 is a diagram illustrating an example of the information stored in a weight rule DB;

FIG. 6 is a diagram illustrating an example of the information stored in a comparison source DB;

FIG. 7 is a diagram illustrating an example of the information stored in a comparison destination DB;

FIG. 8 is a diagram illustrating an example of the information stored in a comparison source attribute DB;

FIG. 9 is a diagram illustrating an example of the information stored in a comparison destination attribute DB;

FIG. 10 is a diagram illustrating an example of the information stored in a comparison result DB;

FIG. 11 is a diagram illustrating an example of the information stored in a common candidate DB;

DESCRIPTION OF EMBODIMENT(S)

Preferred embodiments of the present invention will be explained with reference to accompanying drawings. The present invention is not limited to these embodiments.

[a] First Embodiment

Figure 1:
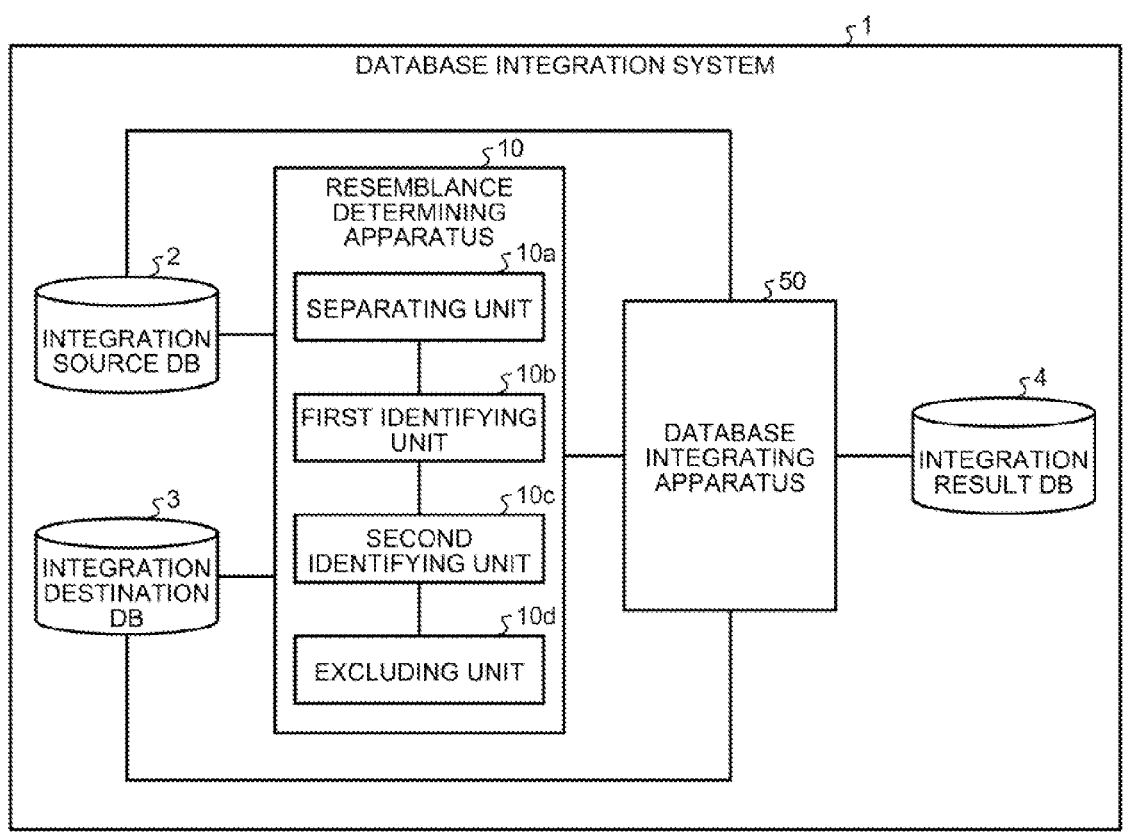
FIG. 1 is a diagram illustrating an exemplary overall configuration of a system that includes a resemblance determining apparatus according to a first embodiment of the present invention.

FIG. 1 is a diagram illustrating an exemplary overall configuration of a system that includes a resemblance determining apparatus according to a first embodiment of the present invention. As illustrated in FIG. 1, a database integration system 1 includes an integration source database (DB) 2, an integration destination DB 3, an integration result DB 4, a resemblance determining apparatus 10, and a database integrating apparatus 50. The database integration system 1 performs a name identification operation on the integration source DB 2 and the integration destination DB 3, determines the items to be integrated, and accordingly generates the integration result DB 4 as a new database. In the present example, there are two DBs that are to be integrated, that is, that are to be subjected to resemblance determination. However, alternatively, as long as there is at least one DB, integration can be performed within the same DB as well.

The integration source DB 2 is a database containing at least one item specified along with corresponding data. Similarly, the integration destination DB 3 is a database containing at least one item specified along with corresponding data. The integration result DB 4 is created newly from the integration source DB 2 and the integration destination DB 3 in the database integration system 1.

The resemblance determining apparatus 10 is a server that performs resemblance determination with respect to the items in the integration source DB 2 and the integration destination DB 3 that are to be integrated. The resemblance determining apparatus 10 includes a separating unit 10a, a first identifying unit 10b, a second identifying unit 10c, and an excluding unit 10d.

The separating unit 10a separates, on a character-by-character basis, the data stored in a corresponding manner to each item in the integration source DB 2 and in the integration destination DB 3. The first identifying unit 10b refers to a correspondence table in which, regarding each item in the integration source DB 2 and in the integration destination DB 3, the data type is specified in a corresponding manner to a character code range belonging to that data type; and accordingly identifies the character code of each character separated by the separating unit 10a.

Regarding each item in the integration source DB 2, the second identifying unit 10c identifies, from the correspondence table, the data type of such data which does not include, in the character code range belonging thereto, at least a single character code from among the character codes of characters as identified by the first identifying unit 10b. The excluding unit 10d excludes, from the target items for resemblance determination with respect to the items in the integration source DB 2, such items in the integration destination DB 3 that have the data types identified by the second identifying unit 10c.

The database integrating apparatus 50 is a server for newly generating the integration result DB 4 by referring to the items and the data stored in the integration source DB 2 as well as stored in the integration destination DB 3. For example, from the resemblance determining apparatus 10, the database integrating apparatus 50 receives items that are determined to be not resembling, and displays those items on a display. Then, the database integrating apparatus 50 receives, from the operator via an input unit such as a mouse, a specification of items to be integrated across the integration source DB 2 and the integration destination DB 3. Subsequently, the database integrating apparatus 50 refers to the data belonging to each specified item, and generates new items and new data in the integration result DB 4.

Figure 2:
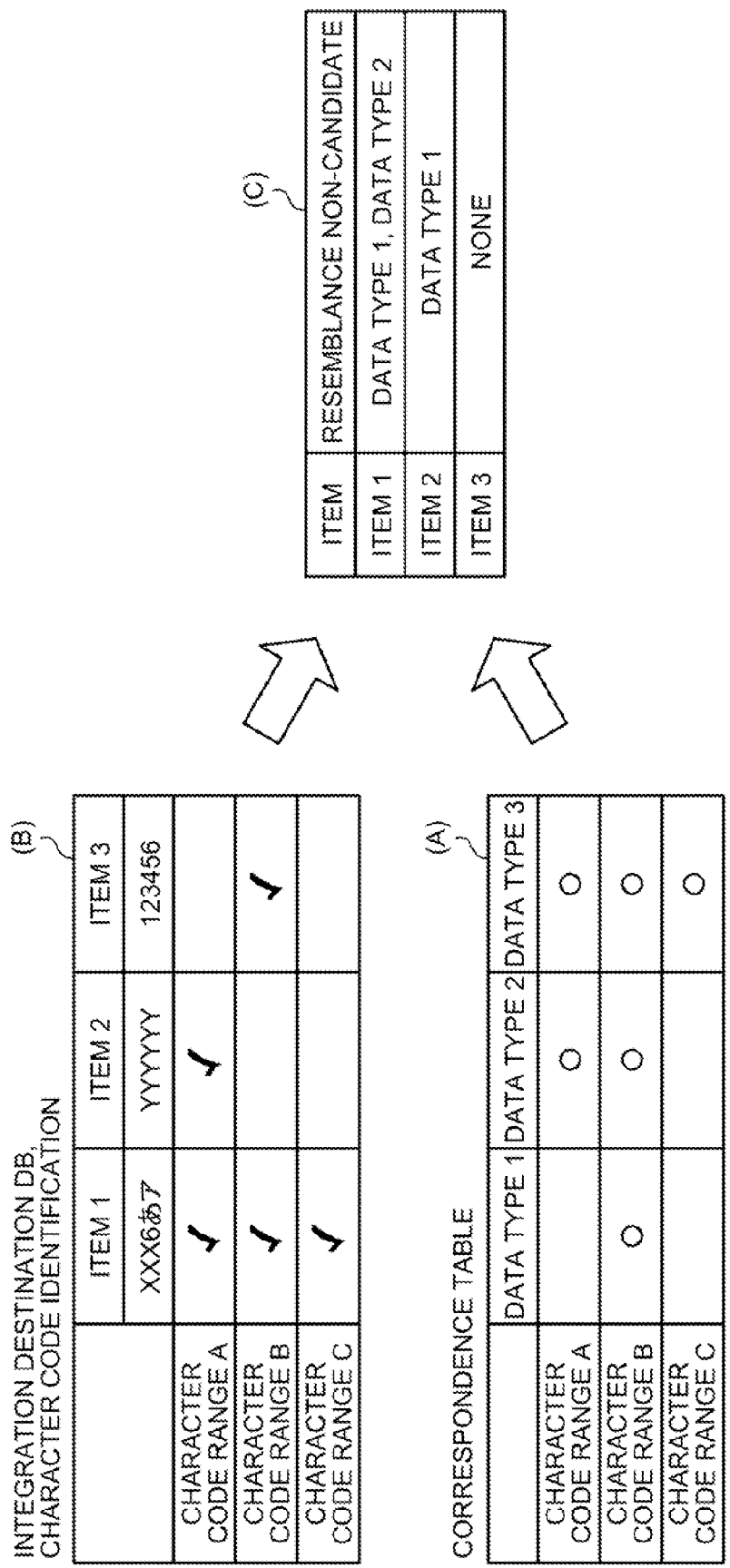
FIG. 2 is an explanatory diagram for explaining an exemplary operation of excluding target items for resemblance determination.

Explained below are the operations performed by the resemblance determining apparatus 10. FIG. 2 is an explanatory diagram for explaining an exemplary operation of excluding target items for resemblance determination. As illustrated in (A) in FIG. 2, the resemblance determining apparatus 10 holds the correspondence table in which the data types are specified in a corresponding manner to character code ranges belonging to the data types. In the example illustrated in FIG. 2, the resemblance determining apparatus 10 indicates that a data type 1 corresponds to a character code range B; a data type 2 corresponds to a character code range A and to the character code range B; and a data type 3 corresponds to the character code range A, to the character code range B, and to a character code range C.

Then, the separating unit 10a separates data "XXX6あア", which belongs to an item 1 stored in the integration destination DB 3, on a character-by-character basis. Then, regarding each character separated from "XXX6あア", the first identifying unit 10b determines whether that character belongs to the character code range A, the character code range B, or the character code range C. Herein, as illustrated in (B) in FIG. 2, the first identifying unit 10b is assumed to determine that one or more of the characters constituting "XXX6あア" belong to each of the character code range A, the character code range B, and the character code range C.

In an identical manner, the separating unit 10a separates data "YYYYYY", which belongs to an item 2 stored in the integration destination DB 3, on a character-by-character basis. Then, regarding each character separated from "YYYYYY", the first identifying unit 10b determines whether that character belongs to the character code range A, the character code range B, or the character code range C. Herein, as illustrated in (B) in FIG. 2, the first identifying unit 10b is assumed to determine that each character constituting "YYYYYY" belongs to the character code range A.

In an identical manner, the separating unit 10a separates data "123456", which belongs to an item 3 in the integration destination DB 3, on a character-by-character basis. Then, regarding each character separated from "123456", the first identifying unit 10b determines whether that character belongs to the character code range A, the character code range B, or the character code range C. Herein, as illustrated in (B) in FIG. 2, the first identifying unit 10b is assumed to determine that each character constituting "123456" belongs to the character code range B.

Subsequently, from the determination result of the first identifying unit 10b, the second identifying unit 10c identifies the data type 1 and the data type 2 as the data types that do not include the character code range A or the character code range C from among the character code ranges to which the data "XXX6あア" of the item 1 belongs. That is, the item 1 is set not to be a candidate for resemblance determination against the items grouped under the data type 1 as well as against the items grouped under the data type 2. For example, when the item 1 is compared with the items grouped under the data type 1, since the data type 1 does not include characters belonging to the character code range A or the character coder range B, it is expected the item 1 does not resemble with any item grouped under the data item 1. Moreover, from the determination result of the first identifying unit 10b, the second identifying unit 10c identifies the data type 1 as the data type that does not include the character code range A to which the data "YYYYYY" of the item 2 belongs. Similarly, from the determination result of the first identifying unit 10b, the second identifying unit 10c determines that there exists no data that does not include the character code range B to which the data "123456" of the item 2 belongs.

As a result, as illustrated in (C) in FIG. 2, the excluding unit 10d sets the data type 1 and the data type 2 as resemblance non-candidates against the item 1 stored in the integration destination DB 3. Moreover, as illustrated in (C) in FIG. 2, the excluding unit 10d sets the data type 1 as a resemblance non-candidate against the item 2 stored in the integration destination DB 3. Furthermore, as illustrated in (C) in FIG. 2, the excluding unit 10d does not set any data type as a resemblance non-candidate against the item 3 stored in the integration destination DB 3.

Besides, for example, assume that, from among the items stored in the integration source DB 2, an item 0 grouped under the data type 2 is specified as a resemblance determination target. In that case, from among the item 1, the item 2, and the item 3 stored in the integration destination DB 3; the excluding unit 10d excludes the item 1, for which the data type 2 is set as a resemblance non-candidate, from resemblance determination targets. Herein, according to the control performed in the resemblance determining apparatus, the item 0 is determined to be resembling to the item 2 and to the item 3.

As an example, assume that the characters belonging to the character code range A represent numbers, the characters belonging to the character code range B represent alphabetical character, the character code range C represents katakana, and the data corresponding to the item 0 is an aggregation of IDs written in alphabetical characters. In that case, if the item 0 is set as a resemblance determination target, then the item 1 containing katakana is excluded from candidates for resemblance determination against the item 0. In this example, the item 3 containing only numbers is not excluded from candidates for resemblance determination. Moreover, in this example, it is assumed that, prior to specifying the item 0 as a resemblance determination target, it is confirmed that the item 0 represents an aggregation of IDs and is grouped under a data type not containing katakana (grouped under the data type 2). Thus, before specifying the item 0 as a resemblance determination target, the user who does that specification determines whether or not it is appropriate to have an aggregation of IDs as a data type (as the data type 2) that contains alphanumeric characters but does not contain katakana.

In this way, regarding the items of DBs that are to be integrated, unlike the conventional method in which resembling items are extracted based on the degrees of resemblance, the resemblance determining apparatus 10 according to the first embodiment identifies non-resembling items according to the data types of the data belonging to the items. That is, as far as the target items for resemblance determination are concerned; the resemblance determining apparatus 10 excludes, from candidates for resemblance determination, such other items which do not have relevancy with the data of the target items for resemblance determination. As a result, it becomes possible not only to prevent excessive narrowing down of resembling items according to the degrees of resemblance but also to prevent an increase in the processing time taken for determining resembling candidates, that is, to prevent an increase in the working hours of the operator who extracts items having relevancy that is beyond resemblance. Moreover, it becomes possible to reduce the number of items to be narrowed down as candidates for resemblance determination according to the degrees of resemblance.

[b] Second Embodiment

Explained below with reference to FIG. 3 to FIG. 15 is a configuration example of the resemblance determining apparatus illustrated in FIG. 1 as well as a sequence of operations performed by the resemblance determining apparatus illustrated in FIG. 1. The following configuration of the resemblance determining apparatus is only exemplary, and the resemblance determining apparatus is not limited to that configuration. Moreover, the information stored in each DB of the resemblance determining apparatus is only exemplary and is not limited to the configuration described below.

Configuration of Resemblance Determining Apparatus

Figure 3:
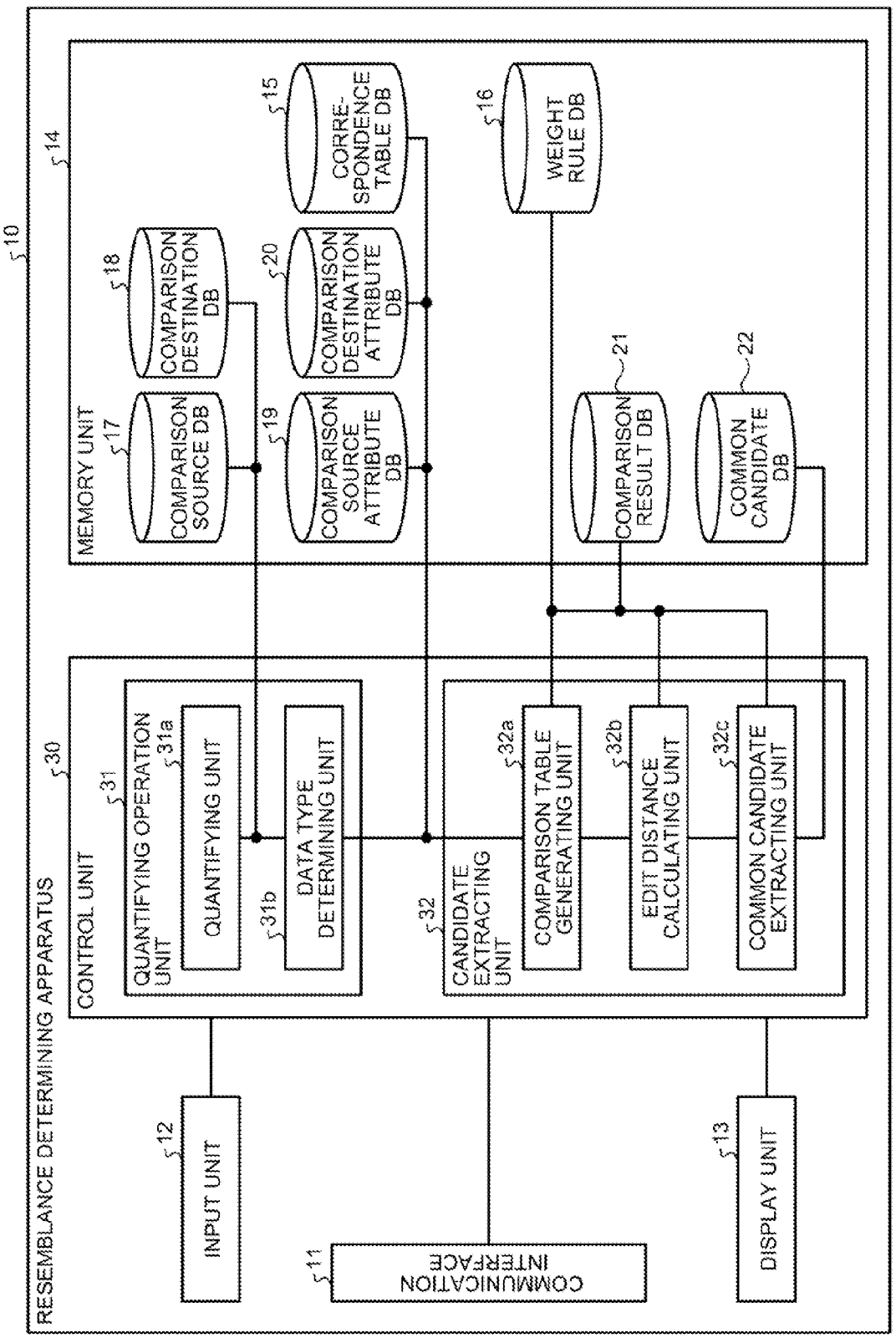
FIG. 3 is a functional block diagram illustrating a configuration of the resemblance determining apparatus according to a second embodiment of the present invention.

FIG. 3 is a functional block diagram illustrating a configuration of the resemblance determining apparatus 10 according to a second embodiment of the present invention. The resemblance determining apparatus 10 includes a communication interface 11, an input unit 12, a display unit 13, a memory unit 14, and a control unit 30.

The communication interface 11 is a communication module such as a network interface card for controlling the communication with other devices. For example, the communication interface 11 outputs the resemblance determination result obtained in the resemblance determining apparatus 10 to an administrator terminal or to the database integrating apparatus 50 illustrated in FIG. 1.

The input unit 12 is an input device such as a keyboard or a mouse for receiving various instructions such as an instruction to start resemblance determination or an instruction to end resemblance determination. The display unit 13 is a display device such as a display or a touch-sensitive panel for displaying a variety of information such as an extraction result of common candidates as obtained by the control unit 30.

The memory unit 14 is a memory device such as a semiconductor memory element or a hard disk that stores therein programs to be executed by the control unit 30 and that has a work area used at the time of performing various operations. The memory unit 14 includes a correspondence table DB 15, a weight rule DB 16, a comparison source DB 17, a comparison destination DB 18, a comparison source attribute DB 19, a comparison destination attribute DB 20, a comparison result DB 21, and a common candidate DB 22.

The correspondence table DB 15 is a database for storing a correspondence table in which the data types are specified in a corresponding manner to the character code ranges belonging to the data types. FIG. 4 is a diagram illustrating an exemplary correspondence table stored in the correspondence table DB 15. As illustrated in FIG. 4, the correspondence table DB 15 stores therein character code groupings, code ranges, and data types in a corresponding manner.

The character code groupings are the groupings of character code ranges. In the example illustrated in FIG. 4, "one-byte control characters" represents a grouping of characters belonging to the range from "0x00" to "0x1F"; "one-byte symbols" represents a grouping of characters belonging to the range from "0x21" to "0x2F"; "one-byte numbers" represents a grouping of characters belonging to the range from "0x30" to "0x39"; "one-byte English capital letters" represents a grouping of characters belonging to the range from "0x41" to "0x5A"; "one-byte English lowercase letters" represents a grouping of characters belonging to the range from "0x61" to "0x7A"; and "one-byte katakana" represents a grouping of characters belonging to the range from "0xA1" to "0xDF".

Similarly, "double-byte symbols" represents a grouping of characters belonging to the range from "0x8140" to "0x81FC"; "double-byte numbers" represents a grouping of characters belonging to the range from "0x8250" to "0x8258"; "double-byte English capital letters" represents a grouping of characters belonging to the range from "0x8260" to "0x8279"; "double-byte English lowercase letters" represents a grouping of characters belonging to the range from "0x8280" to "0x829A"; "double-byte katakana" represents a grouping of characters belonging to the range from "0x8340" to "0x8396"; "double-byte hiragana" represents a grouping of characters belonging to the range from "0x829F" to "0x82F1"; and "double-byte kanjis" represents a grouping of characters belonging to the range from "0x8140" to "0xA0FC". The range other than the above ranges represents a group belonging to "double-byte other". Herein, although the shifted JIS code is given as an example, it is also possible to use another type such as UNICODE. In FIG. 4, "Cyrillic alphabets" and "Greek alphabets" are illustrated as examples of UNICODE. When UNICODE is used, code ranges according to the specifications of UNICODE are defined in the correspondence table.

With reference to FIG. 4, the group "one-byte control characters" belongs to a data type "undefined". The group "one-byte symbols" belongs to data types "symbol", "numerical value", "identifier", "kana", "Japanese", "Russian", "Greek", and "undefined". The group "one-byte numbers" belongs to data types "numerical value", "identifier", "kana", "Japanese", "Russian", "Greek", and "undefined". The group "one-byte English capital letters" as well as the group "one-byte English lowercase letters" belongs to data types "identifier", "kana", "Japanese", "Russian", "Greek", and "undefined". The group "one-byte katakana" belongs to data types "kana", "Japanese", "Russian", "Greek", and "undefined".

The groups "double-byte symbols" and "double-byte numbers" belong to data types "numerical value", "identifier", "kana", "Japanese", and "undefined". The group "double-byte English capital letters" as well as the group "double-byte English lowercase letters" belongs to data types "identifier", "kana", "Japanese", and "undefined". The groups "double-byte katakana" and "double-byte hiragana" belong to data types "kana", "Japanese", and "undefined". The group "double-byte kanjis" belongs to data types "Japanese", and "undefined". The group "Cyrillic alphabets" belongs to the data type "Russian". The group "Greek alphabets" belongs to the data type "Greek". The group "double-byte other" belongs to the data type "undefined".

Meanwhile, the data types "symbol", "numerical value", "identifier", "kana", "Japanese", "Russian", "Greek", and "undefined" illustrated in FIG. 4 form an inclusion relation of character code ranges in that order. That is, regarding the character code distribution corresponding to a particular data type that includes another character code distribution corresponding to another data type, the another data type is given the order of precedence than the particular data type. For example, the data type "number" includes the character codes belonging to the data type "symbol"; while the data type "identifier" includes the character codes belonging to the data type "symbol" or the data type "numerical value". In an identical manner, the data type "kana" includes the character codes belonging to the data type "symbol" or the data type "numerical value" or the data type "identifier"; while the data type "Japanese" includes the character codes belonging to the data type "symbol" or the data type "numerical value" or the data type "identifier" or the data type "kana". Moreover, the data type "Russian" as well as the data type "Greek" includes a portion of the character codes belonging to the data types "symbol", "numerical value", "identifier", "kana", and "Japanese". The data type "undefined" includes the character codes belonging to all of the data types "symbol", "numerical value", "identifier", "kana", "Japanese", "Russian", and "Greek".

Returning to the explanation with reference to FIG. 3, the weight rule DB 16 is a database for storing a crosschecking method, which is implemented to crosscheck the integration source and the integration destination, and for storing weighting. FIG. 5 is a diagram illustrating an example of the information stored in the weight rule DB 16. As illustrated in FIG. 5, the weight rule DB 16 stores therein "crosschecking item", "crosschecking method", and "weighting" in a corresponding manner. Herein, "crosschecking item" represents data to be crosschecked across the integration source and the integration destination; "crosschecking method" represents methods at the time of crosschecking; and "weighting" represents weights attached to crosschecking results.

In the example illustrated in FIG. 5, regarding "item name", crosschecking is performed with "edit distance" and the crosschecking result is multiplied by a weight "10". Similarly, regarding "maximum length", crosschecking is performed with "common logarithm" and the crosschecking result is multiplied by a weight "2". Moreover, regarding "average length", crosschecking is performed with "common logarithm" and the crosschecking result is multiplied by a weight "3". Furthermore, regarding "data type", crosschecking is performed with "string matching" and the crosschecking result is multiplied by a weight "9". Moreover, regarding "NULL probability", crosschecking is performed with "common logarithm" and the crosschecking result is multiplied by a weight "1". Meanwhile, "unique count" is excluded from the target data for crosschecking. Moreover, regarding "degree of discretion", crosschecking is performed with "common logarithm" and the crosschecking result is multiplied by a weight "1".

Herein, the crosschecking item "item name" represents an item stored in the comparison source DB 17 or the comparison destination DB 18. The crosschecking item "maximum length" represents the maximum data length of characters constituting the data belonging to an item. The crosschecking item "average length" represents the average data length of characters constituting the data belonging to an item. The crosschecking item "data type" represents the data type belonging to an item and is determined by a data type determining unit 31b described later. The crosschecking item "NULL probability" represents the NULL ratio in the data belonging to an item. The crosschecking item "unique count" represents the number of strings which are not same as other strings of the data belonging to an item. The crosschecking item "degree of discretion" represents the unique count ratio in the number of strings constituting the data belonging to an item.

The comparison source DB 17 is a database for storing comparison sources for which resembling items are to be determined. In the first embodiment, with respect to each item stored in the comparison source DB 17, a resembling item is extracted from the comparison destination DB 18. FIG. 6 is a diagram illustrating an example of the information stored in the comparison source DB 17. Herein, as an example, household appliances sales data is illustrated. As illustrated in FIG. 6, the comparison source DB 17 stores therein "price", "device type", "model number", and "selling date" in a corresponding manner. In the example illustrated in FIG. 6, as the information regarding "price, device type, model number, selling date"; the comparison source DB 17 stores therein "98,000, 冷蔵庫, GAH2000, 12/16/2009", "2,800, イヤフォン, HSZ-1000, 12/21/2009", "24,800, 充電池, QA87913, 12/22/2009", "980, ゲーム機, A3-7Z19, 1/5/2010", and "18,100, シェーバー, X2AZ4000, 3/25/2010".

Herein, "price" represents the retail prices of products, "device type" represents the types of products that have been sold, "model number" represents the manufacturing numbers or the product serial numbers of the products that have been sold, and "selling date" represents the dates on which the products have been sold.

The comparison destination DB 18 is a database for storing comparison destinations from which resembling items are to be determined. In the first embodiment, with respect to each item stored in the comparison source DB 17, a resembling item is extracted from the items stored in the comparison destination DB 18. FIG. 7 is a diagram illustrating an example of the information stored in the comparison destination DB 18. Herein, as an example, household appliances purchase data is illustrated. As illustrated in FIG. 7, as the information regarding "date of purchase, model number, product class, quantity"; the comparison destination DB 18 stores therein "12/1/2009, FSX7878, 掃除機, 20", "12/8/2009, TZ12-328, パソコン, 5", "12/15/2009, 32Z294GY, エアコン, 25", and "12/22/2009, HSZ-1000, イヤフォン, 10".

Herein, "date of purchase" represents the dates on which the products have been purchased, "model number" represents the manufacturing numbers or the product serial numbers of the products that have been purchased, "product class" represents the product names that have been purchased, and "quantity" represents the quantities of the products that have been purchased.

The comparison source attribute DB 19 is a database for storing information generated by a quantifying operation unit 31 described later. That is, the comparison source attribute DB 19 stores therein information in quantified form obtained by quantifying the information stored in the comparison source DB 17. FIG. 8 is a diagram illustrating an example of the information stored in the comparison source attribute DB 19. As illustrated in FIG. 8, the comparison source attribute DB 19 stores therein "item name", "maximum length", "average length", "data type", "NULL probability", "unique count", and "degree of discretion" in a corresponding manner. Herein, since the stored information has the same explanation as the explanation given with reference to FIG. 5, the explanation is not repeated.

In the example illustrated in FIG. 8, as the information regarding "item name, maximum length, average length, data type, NULL probability, unique count, degree of discretion"; the comparison source attribute DB 19 stores therein "price, 6, 5, numerical value, 0, 5, 100", "device type, 10, 8, Japanese, 0, 5, 100", "model number, 8, 7, identifier, 0, 5, 100", and "selling date, 10, 9, numerical value, 0, 5, 100".

The comparison destination attribute DB 20 is a database for storing information generated by the quantifying operation unit 31 described later. That is, the comparison destination attribute DB 20 stores therein information in quantified form obtained by quantifying the information stored in the comparison destination DB 18. FIG. 9 is a diagram illustrating an example of the information stored in the comparison destination attribute DB 20. As illustrated in FIG. 9, the comparison destination attribute DB 20 stores therein "item name", "maximum length", "average length", "data type", "NULL probability", "unique count", and "degree of discretion" in a corresponding manner. Herein, since the stored information has the same explanation as the explanation given with reference to FIG. 5, the explanation is not repeated.

In the example illustrated in FIG. 9, as the information regarding "item name, maximum length, average length, data type, NULL probability, unique count, degree of discretion"; the comparison destination attribute DB 20 stores therein "date of purchase, 10, 9, numerical value, 0, 4, 100", "model number, 8, 7, identifier, 0, 4, 100", "product class, 10, 8, Japanese, 0, 4, 100", and "quantity, 2, 1, numerical value, 0, 4, 100".

The comparison result DB 21 is a database for storing the information generated by a candidate extracting unit 32. That is, the comparison result DB 21 stores therein resemblance determination results generated by referring to the comparison source attribute DB 19, to the comparison destination attribute DB 20, and to the weight rule DB 16. FIG. 10 is a diagram illustrating an example of the information stored in the comparison result DB 21. As an example, FIG. 10 illustrates a result of resemblance determination performed between the item name "device type" stored in the comparison source attribute DB 19 and each item stored in the comparison destination attribute DB 20. As illustrated in FIG. 10, the comparison result DB 21 stores therein "item name", "item name coincidence degree", "closeness of maximum length", "closeness of average length", "data type matching", "NULL probability", "unique count", "degree of discretion", and "degree of resemblance" in a corresponding manner.

Herein, "item name" represents the item names of comparison destinations, and corresponds to "date of purchase", "model number", "product class", and "quantity" that are comparison destinations for "device type" stored in the comparison source DB 17. Next, "item name coincidence degree" represents the degree of coincidence of an items name as determined according to the edit distance. Next, "closeness of maximum length" represents a value obtained by subtracting, from 1, the modulus of a value calculated by subtracting the common logarithm of a maximum length stored in the comparison destination attribute DB 20 from the common logarithm of a maximum length stored in the comparison source attribute DB 19. Next, "closeness of average length" represents a value obtained by subtracting, from 1, the modulus of a value calculated by subtracting the common logarithm of an average length stored in the comparison destination attribute DB 20 from the common logarithm of an average length stored in the comparison source attribute DB 19. Next, "data type matching" represents whether or not the strings constituting a data type stored in the comparison source attribute DB 19 are matching with the strings constituting a data type stored in the comparison destination attribute DB 20. If the strings are matching, "data type matching" has "1" set therein; and if the strings are not matching, "data type matching" has "0" set therein.

Next, "NULL probability" represents a value obtained by subtracting, from 1, the modulus of a value calculated by subtracting the common logarithm of a NULL probability stored in the comparison destination attribute DB 20 from the common logarithm of a NULL probability stored in the comparison source attribute DB 19. Next, "unique count" represents a value obtained by subtracting, from 1, the modulus of a value calculated by subtracting the common logarithm of a unique count stored in the comparison destination attribute DB 20 from the common logarithm of a unique count stored in the comparison source attribute DB 19. Moreover, "degree of discretion" represents a value obtained by subtracting, from 1, the modulus of a value calculated by subtracting the common logarithm of a degree of discretion stored in the comparison destination attribute DB 20 from the common logarithm of a degree of discretion stored in the comparison source attribute DB 19. Furthermore, "degree of resemblance" represents a normalized value obtained by adding a weight to "item name, item name coincidence degree, closeness of maximum length, closeness of average length, matching of data types, NULL probability, unique count, degree of discretion, degree of resemblance" of the corresponding item.

In the example illustrated in FIG. 10, as the information regarding "item name, item name coincidence degree, closeness of maximum length, closeness of average length, matching of data types, NULL probability, unique count, degree of discretion, degree of resemblance"; the comparison result DB 21 stores therein "date of purchase, 0, 1, 0.95, 0, 1, 0, 1, 0.263", "model number, 0, 0.90, 0.94, 0, 1, 0, 1, 0.255", "product class, 0.25, 1, 1, 1, 1, 0, 1, 0.712", and "quantity, 0, 0.30, 0.10, 0, 1, 0, 1, 0.111".

The common candidate DB 22 is a database for storing common candidates that have been extracted. FIG. 11 is a diagram illustrating an example of the information stored in the common candidate DB 22. As illustrated in FIG. 11, the common candidate DB 22 stores therein "item", "common candidate 1 (degree of resemblance)", "common candidate 2 (degree of resemblance)", and so on. Herein, "item" represents the names of comparison source items, that is, the names of items stored in the comparison source DB 17. Herein, "common candidate (degree of resemblance)" represents degrees of resemblance, from among the calculated degrees of resemblance, that are equal to or higher than a predetermined value and that are arranged in descending order.

Thus, in the example illustrated in FIG. 11, with respect to the item "device type" stored in the comparison source DB 17, it is indicated that the item "product class" that is stored in the comparison destination DB 18 and that is calculated to have a degree of resemblance of "0.712" is the most resembling item. In an identical manner, with respect to the item "price" stored in the comparison source DB 17, it is indicated that the item "quantity" that is stored in the comparison destination DB 18 and that is calculated to have a degree of resemblance of "0.665" is the most resembling item. In addition, with respect to the item "price" stored in the comparison source DB 17, it is indicated that the item "date of purchase" that is stored in the comparison destination DB 18 and that is calculated to have a degree of resemblance of "0.542" is the second most resembling item. Meanwhile, the predetermined value can be arbitrarily set to, for example, a degree of resemblance of "0.5".

The control unit 30 includes the quantifying operation unit 31 and the candidate extracting unit 32, and is configured with an integrated circuit such as a field-programmable gate array (FPGA) or with an electronic circuit such as a central processing unit (CPU) for performing resemblance determination of items across databases.

The quantifying operation unit 31 includes a quantifying unit 31a and the data type determining unit 31b. With respect to the comparison source DB 17 as well as the comparison destination DB 18, the quantifying operation unit 31 quantifies "data" stored in a corresponding manner to "item". For example, with respect to the data corresponding to each of "price", "device type", "model number", and "selling date" stored in the comparison source DB 17; the quantifying unit 31a calculates "maximum length, average length, data type, NULL probability, unique count, degree of discretion" and outputs that information to the comparison source attribute DB 19. In an identical manner, with respect to the data of each "date of purchase", "model number", "product class", and "quantity"; the quantifying unit 31a calculates "maximum length, average length, data type, NULL probability, unique count, degree of discretion" and outputs that information to the comparison destination attribute DB 20.

As an example, regarding "device type" stored in the comparison source DB 17, the quantifying unit 31a extracts the corresponding data of "冷蔵庫", "イヤフォン", "シェーバー", "充電池", and "ゲーム機". Then, while considering one-byte characters to be "1", the quantifying unit 31a detects the maximum lengths. That is, the quantifying unit 31a detects 6-byte "冷蔵庫" as "6", detects 10-byte "イヤフォン" as "10", detects 10-byte "シェーバー" as "10", detects 6-byte "充電池" as "6", and detects 8-byte "ゲーム機" as "8". As a result, the quantifying unit 31a identifies "10" as the maximum length of "device type" stored in the comparison source DB 17.

Moreover, the quantifying unit 31a calculates the average length of strings of the calculated sets of data. In the example given above, the quantifying unit 31a divides "6+10+10+6+8=40" by "5" and accordingly identifies "8" as the average length of "device type" stored in the comparison source DB 17. Furthermore, the quantifying unit 31a counts the number of blank spaces, that is, counts the NULL count in "冷蔵庫", "イヤフォン", "シェーバー", "充電池", and "ゲーム機". In the present example, since the NULL count is zero, the quantifying unit 31a identifies "0" as the NULL probability of "device type" stored in the comparison source DB 17.

Moreover, from among "冷蔵庫", "イヤフォン", "シェーバー", "充電池", and "ゲーム機"; the quantifying unit 31a counts the overlapping sets of data. In this example, since the number of overlapping sets of data is zero, the quantifying unit 31a identifies "0" as the unique count of "device type" stored in the comparison source DB 17. Meanwhile, the quantifying unit 31a can search for the overlapping sets of data using a commonly-used character recognition technique. Moreover, since there is no overlapping among "冷蔵庫", "イヤフォン", "シェーバー", "充電池", and "ゲーム機"; the quantifying unit 31a identifies "100" as the degree of discretion of "device type" stored in the comparison source DB 17.

As another example, regarding the "date of purchase" stored in the comparison destination DB 18, the quantifying unit 31a extracts the corresponding data of "12/1/2009", "12/8/2009", "12/15/2009", and "12/22/2009". Then, while considering one-byte characters to be "1", the quantifying unit 31a detects the maximum lengths. That is, the quantifying unit 31a detects 9-byte "12/1/2009" as well as 9-byte "12/8/2009" as "9". Moreover, the quantifying unit 31a detects 10-byte "12/15/2009" as well as 10-byte "12/22/2009" as "10". As a result, regarding the "date of purchase" stored in the comparison destination DB 18, the quantifying unit 31a identifies "10" as the maximum length.

Moreover, the quantifying unit 31a calculates the average of the calculated string length of each set of data. With reference to the example given above, "9+9+10+10=38" divided by "4" comes out to be "9.5". There, the quantifying unit 31a identifies "9" as the average length of "date of purchase" stored in the comparison destination DB 18. Furthermore, the quantifying unit 31a counts the number of blank spaces, that is, counts the NULL count in "12/1/2009", "12/8/2009", "12/15/2009", and "12/22/2009". In the present example, since the NULL count is zero, the quantifying unit 31a identifies "0" as the NULL probability of "date of purchase" stored in the comparison destination DB 18.

Moreover, from among "12/1/2009", "12/8/2009", "12/15/2009", and "12/22/2009"; the quantifying unit 31a counts the number of overlapping sets of data. In this example, since the number of overlapping sets of data is zero, the quantifying unit 31a identifies "4" as the unique count of "device type" stored in the comparison destination DB 18. Since there is no overlapping among "12/1/2009", "12/8/2009", "12/15/2009", and "12/22/2009"; the quantifying unit 31a identifies "100" as the degree of discretion of "date of purchase" stored in the comparison destination DB 18.

Furthermore, for example, when "冷蔵庫", "イヤフォン", "シェーバー", "充電池", and "ゲーム機" represents the data corresponding to "device type"; the quantifying unit 31a identifies "4" as the "unique count". Then, since four out of five sets of those data are not overlapping and are unique, the quantifying unit 31a identifies 4/5×100=80 as "degree of uniqueness".

Returning to the explanation with reference to FIG. 3, the data type determining unit 31b determines the data type of each of "price", "device type", "model number", and "selling date" stored in the comparison source DB 17; and stores the data types in the comparison source attribute DB 19. In an identical manner, the data type determining unit 31b determines the data type of each of "date of purchase", "model number", "product class", and "quantity"; and stores the data types in the comparison destination attribute DB 20.

As an example, the data type determining unit 31b separates, on a character-by-character basis, "冷蔵庫イヤフォンシェーバー 充電池ゲーム機", representing the data corresponding to "device type" stored in the comparison source DB 17. That is, the data type determining unit 31b separates the data into "冷", "蔵", "庫", "イ", "ヤ", "フ", "ォ", "ン", "シ", "エ", "—", "バ", "—", "充", "電", "池", "ゲ", "—", "ム", and "機". Then, the data type determining unit 31b identifies the character code of each separated character and, from among the character code groupings illustrated in FIG. 4, determines the character code grouping corresponding to each character code. That is, the data type determining unit 31b determines the character code groupings corresponding to "冷", "蔵", "庫", "イ", "ヤ", "フ", "ォ", "ン", "シ", "エ", "—", "バ", "—", "充", "電", "池", "ゲ", "—", "ム", and "機".

In this example, the data type determining unit 31b determines that "冷蔵庫イヤフォンシェーバー 充電池ゲーム機", which represents the data corresponding to "device type" stored in the comparison source DB 17, corresponds to either "double-byte katakana" or "double-byte kanji". As a result, from the correspondence table DB 15, the data type determining unit 31b identifies that the attributes belonging to the character code groupings of "double-byte katakana" or "double-byte kanji" are "Japanese" and "undefined". Then, from among "Japanese" and "undefined", the data type determining unit 31b identifies the attribute having a smaller character code range, that is, identifies "Japanese" having a smaller # number, which serves as an identifier in FIG. 4, as the data type of "device type", and stores that data type in the comparison source attribute DB 19. Thus, the data type determining unit 31b decides that the data attributes "symbol", "number", "identifier", and "kava" that have smaller character code ranges than the data attribute "Japanese" are not to be considered as candidates for resemblance determination.

As another example, the data type determining unit 31b separates, on a character-by-character basis, the data "FSX7878TZ12-32832Z294GYHSZ-1000" representing the data corresponding to "model number" stored in the comparison destination DB 18. That is, the data type determining unit 31b separates the data into "F", "S", "X", "7", "8", "7", "8", "T", "Z", "1", "2", "-", "3", "2", "8", "3", "2", "Z", "2", "9", "4", "G", "Y", "H", "S", "Z", "-", "1", "0", "0", and "0". Then, the data type determining unit 31b identifies the character code of each separated character and, from among the character code groupings illustrated in FIG. 4, determines the character code grouping corresponding to each character code.

In this example, the data type determining unit 31b determines that the data "FSX7878TZ12-32832Z294GYHSZ-1000", which represents the data corresponding to "model number" stored in the comparison destination DB 18, corresponds to either "one-byte symbols", or "one-byte numbers", or "one-byte English capital letters". Consequently, from the correspondence table DB 15, the data type determining unit 31b identifies that the data attributes belonging to the character code groupings "one-byte symbols", "one-byte numbers", and "one-byte English capital letters" are "identifier", "kana", "Japanese", "Russian", "Greek", and "undefined". Then, from among those data attributes, the data type determining unit 31b identifies the attribute having the smallest character code range, that is, identifies "identifier" having the smallest # number, which serves as an identifier in FIG. 4, as the data type of "model number", and stores that data type in the comparison destination attribute DB 20. That is, the data type determining unit 31b decides that the data attributes "symbol" and "number" having smaller character code ranges than the data attribute "identifier" are not to be considered as candidates for resemblance determination.

The candidate extracting unit 32 includes a comparison table generating unit 32a, an edit distance calculating unit 32b, and a common candidate extracting unit 32c. The candidate extracting unit 32 compares the items stored in the comparison source attribute DB 19 with the items stored in the comparison destination attribute DB 20, and extracts common items. Herein, the explanation is given for an example of extracting, from the comparison destination attribute DB 20, resembling items for the item "device item" that is stored in the comparison source attribute DB 19.

The comparison table generating unit 32a follows the crosschecking methods illustrated in FIG. 5 and calculates values by crosschecking with the items stored in the comparison source attribute DB 19 and with the items stored in the comparison destination attribute DB 20, and stores those values in the comparison result DB 21.

For example, as "closeness of maximum length", the comparison table generating unit 32a calculates "1−absolute value of [(common logarithm or maximum length of comparison source)−(common logarithm or maximum length of comparison destination)]". As an example, the comparison table generating unit 32a calculates "0" by subtracting the common logarithm "1" of the maximum length "10" of the item "product class" stored in the comparison destination attribute DB 20 from the common logarithm "1" of the maximum length "10" of the item "device type" stored in the comparison source attribute DB 19. Then, in the comparison result DB 21, the comparison table generating unit 32a stores "1", which is obtained by subtracting the abovementioned "0" from 1, as "closeness of maximum length" between "device type" and "product class".

Similarly, as "closeness of average length", the comparison table generating unit 32a calculates "1−absolute value of [(common logarithm or average length of comparison source)−(common logarithm or average length of comparison destination)]". As an example, the comparison table generating unit 32a calculates "0" by subtracting the common logarithm "0.90 . . . " of the average length "8" of the item "product class" stored in the comparison destination attribute DB 20 from the common logarithm "0.90 . . . " of the average length "8" of the item "device type" stored in the comparison source attribute DB 19. Then, in the comparison result DB 21, the comparison table generating unit 32a stores "1", which is obtained by subtracting the abovementioned "0" from 1, as "closeness of average length" between "device type" and "product class".

Moreover, depending on the matching of strings of the data types, the comparison table generating unit 32a stores "1" or "0" in the comparison result DB 21. As an example, the comparison table generating unit 32a determines that the data type "Japanese" of the item "device type" stored in the comparison source attribute DB 19 matches with the data type "Japanese" of the item "product class" stored in the comparison destination attribute DB 20. As a result, in the comparison result DB 21, the comparison table generating unit 32a stores "1" as "data type matching" between "device type" and "product class".

Furthermore, as "NULL probability", the comparison table generating unit 32a calculates "1−absolute value of [(common logarithm or NULL probability of comparison source)−(common logarithm or NULL probability of comparison destination)]". As an example, the comparison table generating unit 32a calculates "0" by subtracting the common logarithm "0" of the NULL probability "1" of the item "product class" stored in the comparison destination attribute DB 20 from the common logarithm "0" of the NULL probability "1" of the item "device type" stored in the comparison source attribute DB 19. Then, in the comparison result DB 21, the comparison table generating unit 32a stores "1", which is obtained by subtracting the abovementioned "0" from 1, as "NULL probability" between "device type" and "product class".

Moreover, the comparison table generating unit 32a ignores the unique count and stores "0" in the comparison result DB 21 as "unique count" between "device type" and "product class".

Furthermore, as "degree of discretion", the comparison table generating unit 32a calculates "1−absolute value of [(common logarithm or degree of discretion of comparison source)−(common logarithm or degree of discretion of comparison destination)]". As an example, the comparison table generating unit 32a calculates "0" by subtracting the common logarithm "10" of the degree of discretion "100" of the item "product class" stored in the comparison destination attribute DB 20 from the common logarithm "10" of the degree of discretion "100" of the item "device type" stored in the comparison source attribute DB 19. Then, in the comparison result DB 21, the comparison table generating unit 32a stores "1", which is obtained by subtracting the abovementioned "0" from 1, as "degree of discretion" between "device type" and "product class".

Returning to the explanation with reference to FIG. 3, the edit distance calculating unit 32b calculates edit distances between item names of the items and then stores the edit distances in the comparison result DB 21. For example, the edit distance calculating unit 32b calculates the edit distance between the item name "device type" stored in the comparison source attribute DB 19 and the item name "product class" stored in the comparison destination attribute DB 20 using a commonly-used algorithm such as the Levenshtein distance algorithm. Herein, the details regarding the commonly-used algorithm such as the Levenshtein distance algorithm are omitted.

With respect to all of the information that is generated by the comparison table generating unit 32a and by the edit distance calculating unit 32b and that is stored in the comparison result DB 21, the common candidate extracting unit 32c calculates degrees of resemblance by assigning weights stored in the weight rule DB 16 and identifies common candidates based on the calculated degrees of resemblance.

As an example, the explanation is given with reference to "date of purchase" and "product class" illustrated in FIG. 10. That is, the explanation is given regarding the calculation of the degree of resemblance between "device type" stored in the comparison source DB 17 and "date of purchase" stored in the comparison destination DB 18, and regarding the calculation of the degree of resemblance between "device type" stored in the comparison source DB 17 and "product class" stored in the comparison destination DB 18.

For example, the common candidate extracting unit 32c multiples the weight "10" of "item name" illustrated in FIG. 5 to "0" corresponding to the item name coincidence degree of "date of purchase", and calculates a combined value "0". In an identical manner, the common candidate extracting unit 32c multiples the weight "2" of the maximum length to "1" corresponding to the closeness of maximum length of "date of purchase", and calculates a combined value "2". Similarly, the common candidate extracting unit 32c multiples the weight "3" of the average length to "0.95" corresponding to the closeness of average length of "date of purchase", and calculates a combined value "2.85". Moreover, the common candidate extracting unit 32c multiples the weight "9" of the data type to "0" corresponding to the data type matching of "date of purchase", and calculates a combined value "0". Furthermore, the common candidate extracting unit 32c multiples the weight "1" of the NULL probability to "1" corresponding to the NULL probability of "date of purchase", and calculates a combined value "1". Similarly, the common candidate extracting unit 32c multiples the weight "0" of the unique count to "0" corresponding to the unique count of "date of purchase", and calculates a combined value "0". Moreover, the common candidate extracting unit 32c multiples the weight "1" of the degree of discretion to "1" corresponding to the degree of discretion of "date of purchase" and calculates a combined value "1".

Subsequently, the common candidate extracting unit 32c adds up the combined values calculated above as "0+2.85+0+1+0+1=6.85" as well as calculates the total value of weights as "10+2+3+9+1+0+1=26". Then, the common candidate extracting unit 32c calculates "6.85/26=0.263 . . . ". With that, the common candidate extracting unit 32c sets "0.263" as the degree of resemblance between the item "device item" stored in the comparison source DB 17 and the "date of purchase" stored in the comparison destination DB 18, and stores that degree of resemblance in the comparison result DB 21.

As another example, the common candidate extracting unit 32c multiples the weight "10" of "item name" illustrated in FIG. 5 to "0.25" corresponding to the item name coincidence degree of "product class", and calculates a combined value "2.5". In an identical manner, the common candidate extracting unit 32c multiples the weight "2" of the maximum length to "1" corresponding to the closeness of maximum length of "product class", and calculates a combined value "2". Similarly, the common candidate extracting unit 32c multiples the weight "3" of the average length to "1" corresponding to the closeness of average length of "product class", and calculates a combined value "3". Moreover, the common candidate extracting unit 32c multiples the weight "9" of the data type to "1" corresponding to the data type matching of "product class", and calculates a combined value "9". Furthermore, the common candidate extracting unit 32c multiples the weight "1" of the NULL probability to "1" corresponding to the NULL probability of "product class", and calculates a combined value "1". Similarly, the common candidate extracting unit 32c multiples the weight "0" of the unique count to "0" corresponding to the unique count of "product class", and calculates a combined value "0". Moreover, the common candidate extracting unit 32c multiples the weight "1" of the degree of discretion to "1" corresponding to the degree of discretion of "product class", and calculates a combined value "1".

Subsequently, the common candidate extracting unit 32c adds up the combined values calculated above as "2.5+2+3+9+1+0+1=18.5" as well as calculates the total value of weights as "26". Then, the common candidate extracting unit 32c calculates "18.5/26=0.7115 . . . ". With that, the common candidate extracting unit 32c sets "0.712" as the degree of resemblance between the item "device item" stored in the comparison source DB 17 and the "product class" stored in the comparison destination DB 18, and stores that degree of resemblance in the comparison result DB 21.

In this way, the common candidate extracting unit 32c calculates the degrees of resemblance among items. Then, regarding each item, the common candidate extracting unit 32c sorts, in descending order, the degrees of resemblance that are equal to or higher than a predetermined value, and then stores the degrees of resemblance in the common candidate DB 22. As an example, from among the degrees of resemblance between the item "device type", which is stored in the comparison source DB 17 illustrated in FIG. 10, and the items stored in the comparison destination DB 18; the common candidate extracting unit 32c identifies the item "product class" as the item having the degree of resemblance equal to or greater than 0.5. Then, as illustrated in FIG. 11, in the common candidate DB 22, the common candidate extracting unit 32c stores "product class (0.712)" as "common candidate 1 (degree of resemblance)" corresponding to the item "device type".

Moreover, regarding the result that is stored as illustrated in FIG. 11, the common candidate extracting unit 32c sends it to the administrator terminal or displays it on the display unit 13. Meanwhile, herein, although the explanation is given for an example of calculating degrees of resemblance with the use of values obtained by multiplying weights to the comparison results illustrated in FIG. 10, it is not the only case. Alternatively, for example, the common candidate extracting unit 32c can also calculate the total value or the average value of a comparison result illustrated in FIG. 10 as the degree of resemblance.

Sequence of Operations

Explained below with reference to FIG. 12 to FIG. 15 are sequences of operations performed in the resemblance determining apparatus according to the second embodiment. The following explanation of sequences includes the sequence of overall operation, the sequence of a data type determination operation, and the sequence of a candidate extraction operation.

Sequence of Overall Operations

Figure 12:
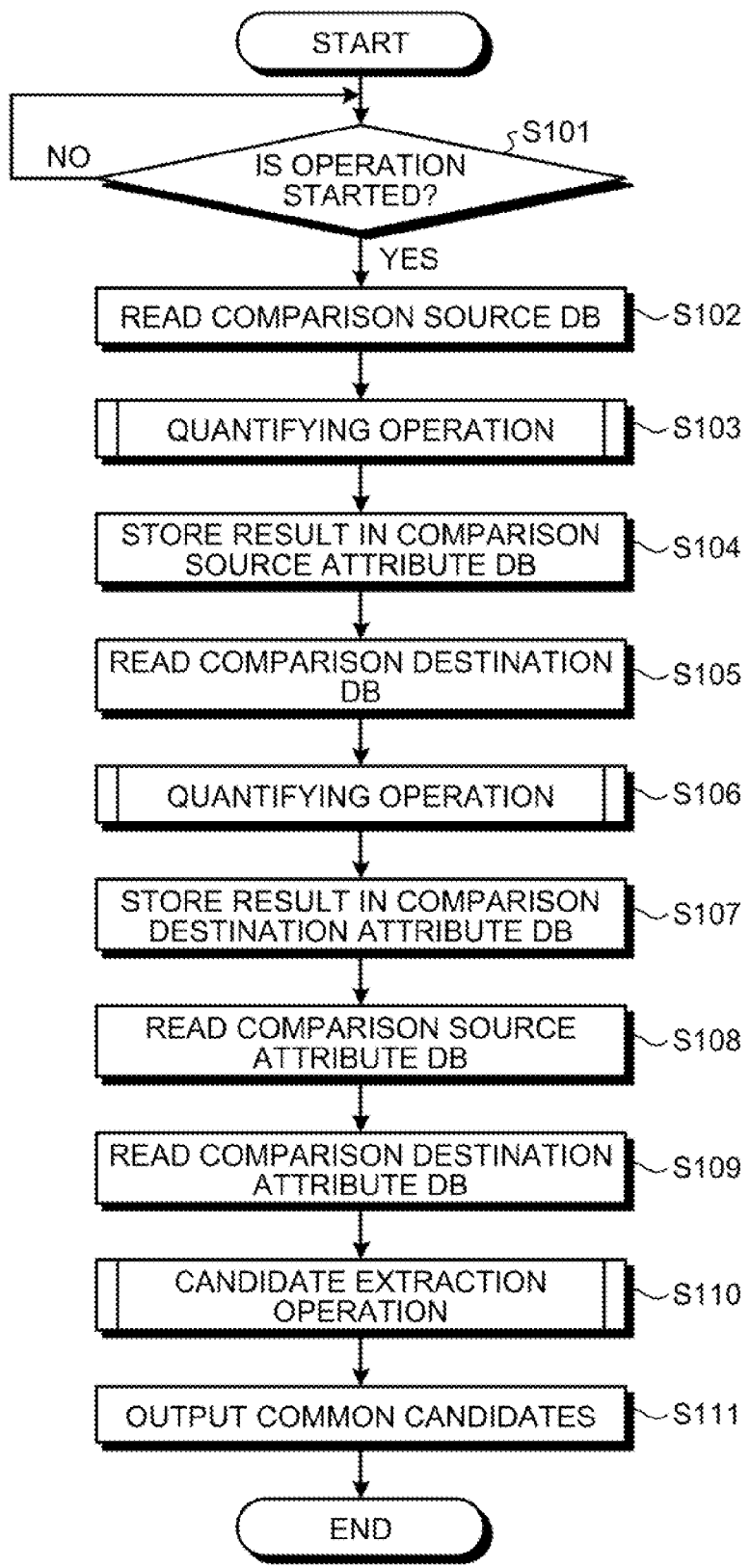
FIG. 12 is a flowchart for explaining the sequence of operations performed in the resemblance determining apparatus according to the second embodiment.

FIG. 12 is a flowchart for explaining the sequence of operations performed in the resemblance determining apparatus according to the second embodiment. As illustrated in FIG. 12, when the control unit 30 of the resemblance determining apparatus 10 receives a start instruction for starting a resemblance determination operation (Yes at S101), the quantifying operation unit 31 reads all items along with the data corresponding to those items from the comparison source DB 17 (S102). Alternatively, at S102, the quantifying operation unit 31 can read only the selected items and the data corresponding to the selected items from the comparison source DB 17. Then, with respect to each read item and the corresponding data, the quantifying operation unit 31 performs a quantifying operation (S103) and stores the result in the comparison source attribute DB 19 (S104).

Subsequently, the quantifying operation unit 31 reads all items along the data corresponding to those items from the comparison destination DB 18 (S105). Then, with respect to each read item and the corresponding data, the quantifying operation unit 31 performs a quantifying operation (S106) and stores the result in the comparison destination attribute DB 20 (S107).

Then, the candidate extracting unit 32 reads the data from the comparison source attribute DB 19 (S108), reads the data from the comparison destination attribute DB (S109), performs a candidate extraction operation using the read data (S110), and displays the common candidates obtained as the result of the candidate extraction operation on the display unit 13 (S111). If any items are selected at Step S102, then the common candidates regarding the selected items are output. Meanwhile, the sequence of operations from S102 to S107 is not fixed as illustrated and can be changed arbitrarily.

Sequence in Quantifying Operation

Figure 13:
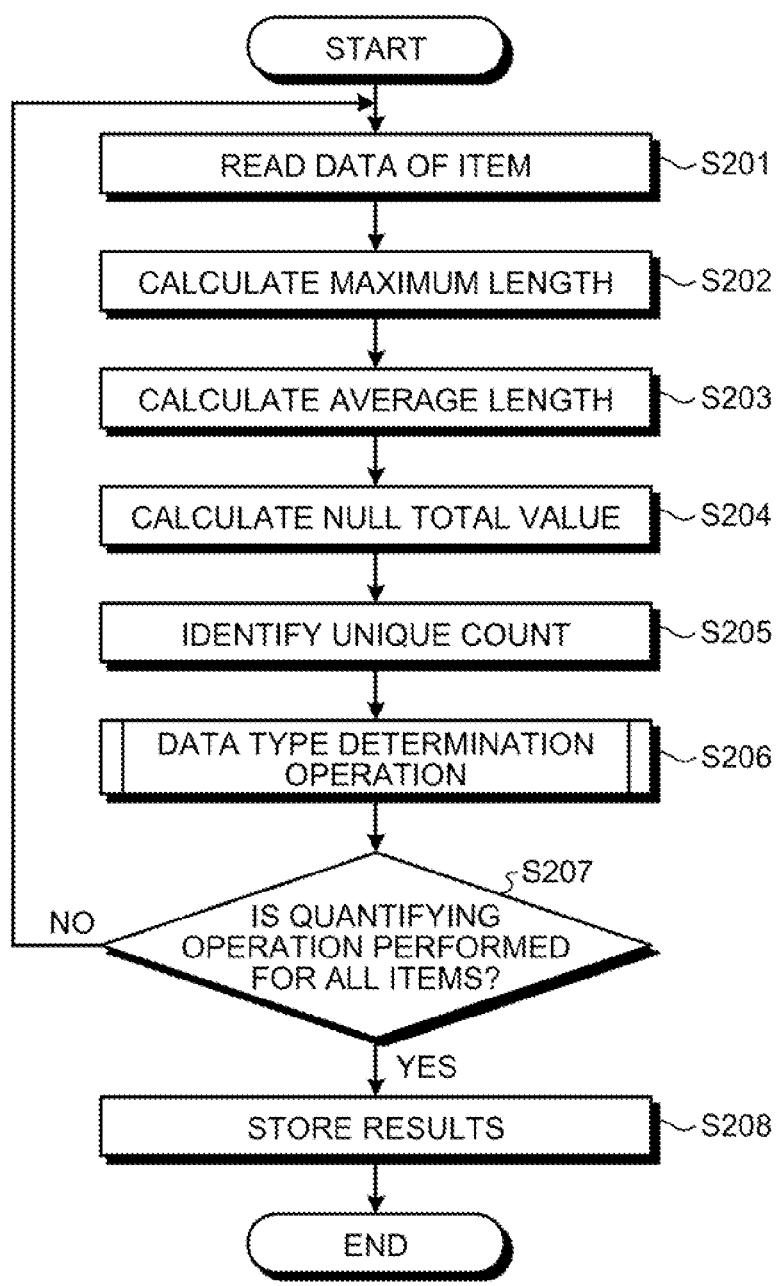
FIG. 13 is a flowchart for explaining the sequence of operations during a quantifying operation performed in the resemblance determining apparatus according to the second embodiment.

FIG. 13 is a flowchart for explaining the sequence of operations during the quantifying operation performed in the resemblance determining apparatus according to the second embodiment. The quantifying operation is performed at S103 and S106 illustrated in FIG. 12.

As illustrated in FIG. 13, the quantifying unit 31a of the quantifying operation unit 31 reads the data stored in a corresponding manner to an item in the comparison source DB 17 or the comparison destination DB 18 (S201). Then, by referring to the read data, the quantifying unit 31a calculates the maximum data length (S202), calculates the average data length (S203), calculates the NULL total value (S204), identifies the unique count (S205), and performs the data type determination operation (S206).

Then, the quantifying unit 31a repeats the operations from S201 to S207 regarding the data corresponding to each item stored in the comparison source DB 17 as well as regarding the data corresponding to each item stored in the comparison destination DB 18 (No at S207). Once the quantifying operation is performed for all items stored in the comparison source DB 17 and the comparison destination DB 18 (Yes at S207), the quantifying unit 31a accordingly stores the results of the quantifying operations in the comparison source attribute DB 19 or the comparison destination attribute DB 20 (S208). Meanwhile, while repeating the operations from S201 to S207, the quantifying unit 31a temporarily stores the data in the work area of the memory unit 14. Moreover, the sequence of operations from S202 to S206 is not fixed as illustrated and can be changed arbitrarily.

Sequence of Data Type Determination Operation

Figure 14:
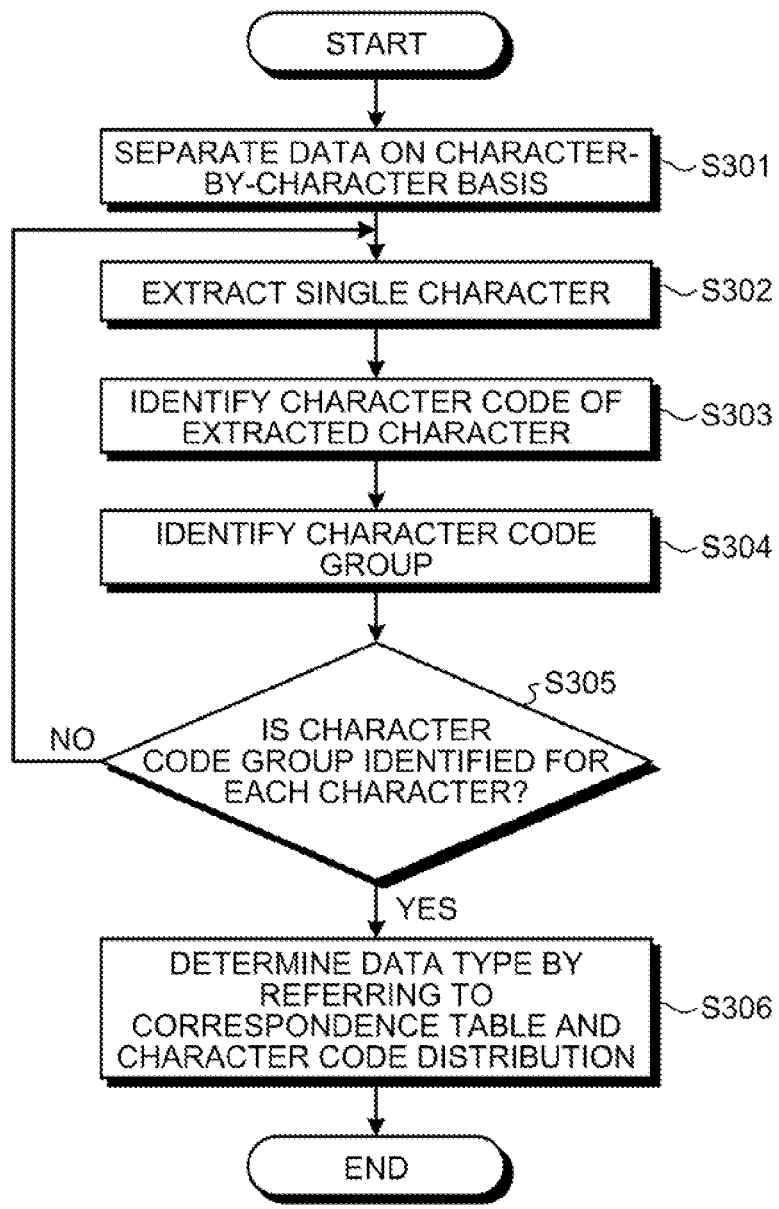
FIG. 14 is a flowchart for explaining the sequence of operations during a data type determination operation performed in the resemblance determining apparatus according to the second embodiment.

FIG. 14 is a flowchart for explaining the sequence of operations during the data type determination operation performed in the resemblance determining apparatus according to the second embodiment. The data type determination operation is performed at S206 illustrated in FIG. 13.

The data type determining unit 31b of the quantifying operation unit 31 reads the data stored corresponding to an item and separates that data on a character-by-character basis (S301). Subsequently, the data type determining unit 31b extracts a single separated character (S302) and identifies the character code of that separated character (S303). Then, based on the correspondence table stored in the correspondence table DB 15, the data type determining unit 31b identifies the character code grouping to which the identified character code belongs (S304).

Regarding each separated character, the data type determining unit 31b repeats the operations from S302 to S304 (No at S305). Once the operations from S302 to S304 are performed for all separated characters (Yes at S305), the data type determining unit 31b determines the data type of the data, which has been read at S301, by referring to the correspondence table stored in the correspondence table DB 15 and by referring to the character code distribution obtained by repeatedly performing the operations from S302 and S04 (S306). Regarding the determination of data types; for example, one of the data types specified in the corresponding table illustrated in FIG. 4 is selected in serial order and, if the character code distribution corresponding to the selected data type includes the character code distribution obtained at S304, then the data type of the data read at S301 is set to the selected data types. On the other hand, if the character code distribution corresponding to the selected data type does not include the character code distribution obtained at S304, then the data type having the next number is selected from the correspondence table illustrated in FIG. 4 and it is determined whether or not the character code distribution corresponding to the newly-selected data type includes the character code distribution obtained at S304. Depending on the determination result, the subsequent data types are sequentially selected and subjected to comparison for determining the inclusion relation of character code distributions.

Sequence of Candidate Extraction Operation

Figure 15:
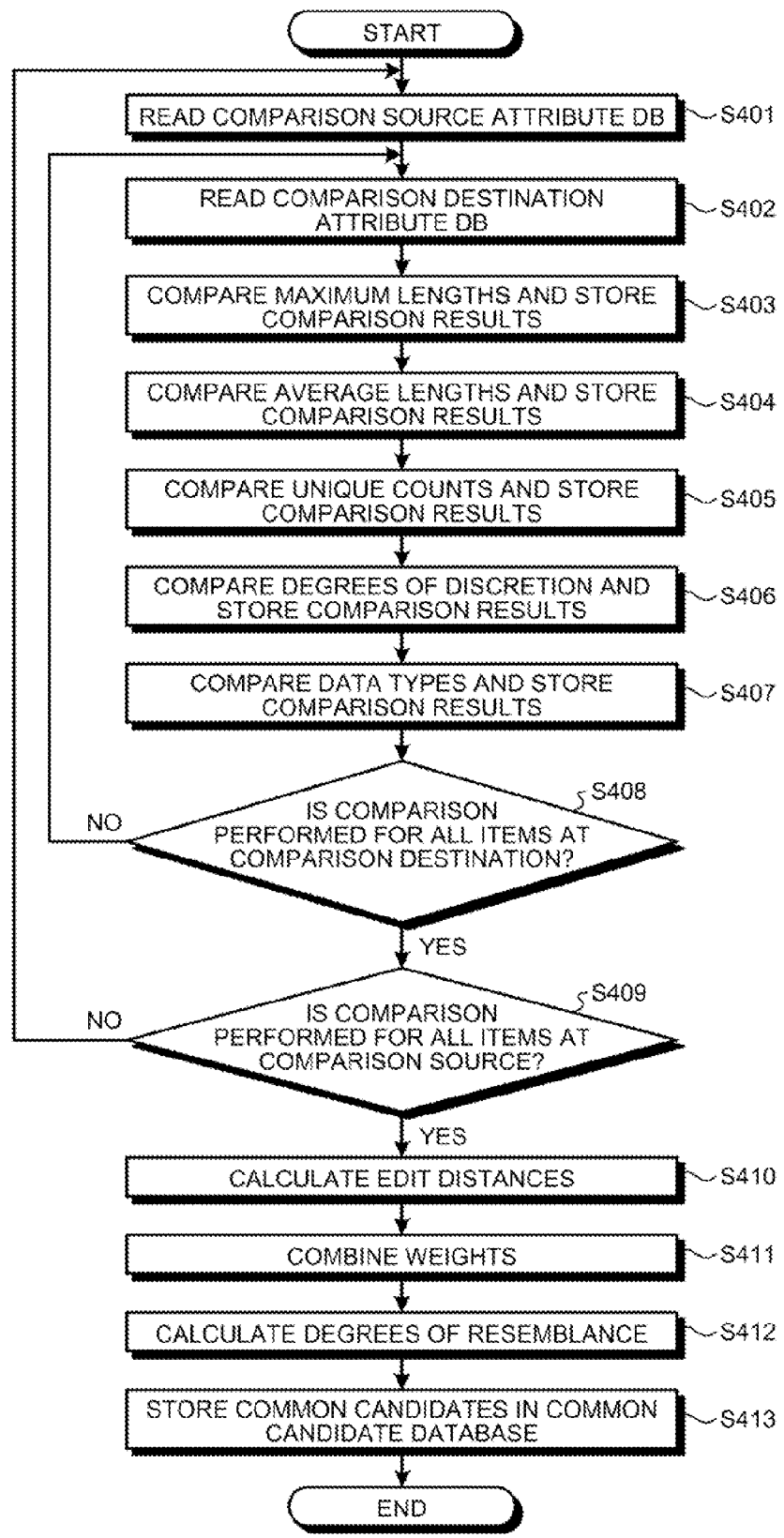
FIG. 15 is a flowchart for explaining the sequence of operations during a candidate extraction operation performed in the resemblance determining apparatus according to the second embodiment.

FIG. 15 is a flowchart for explaining the sequence of operations during the candidate extraction operation performed in the resemblance determining apparatus according to the second embodiment.

The comparison table generating unit 32a of the candidate extracting unit 32 reads the data corresponding to one of the items from the information stored in the comparison source attribute DB 19 (S401) and reads the data corresponding to one of the items from the information stored in the comparison destination attribute DB 20 (S402).

Then, the comparison table generating unit 32a compares the maximum lengths of the sets of read data and stores the comparison results in the comparison result DB (S403). In an identical manner, the comparison table generating unit 32a compares the average lengths of the sets of read data and stores the comparison results in the comparison result DB 21 (S404). Similarly, the comparison table generating unit 32a compares the unique counts of the sets of read data and stores the comparison results in the comparison result DB 21 (S405). Moreover, the comparison table generating unit 32a compares the degrees of discretion of the sets of read data and stores the comparison results in the comparison result DB 21 (S406). Furthermore, the comparison table generating unit 32a compares the data type matching of the sets of read data and stores the comparison results in the comparison result DB 21 (S407). Meanwhile, the sequence of operations from S403 to S407 is not fixed as illustrated and can be changed arbitrarily.

Then, with respect to the combinations of a single item stored in the comparison source attribute DB 19 and all items stored in the comparison destination attribute DB 20, the comparison table generating unit 32a repeats the operations from S403 to S407 (No at S408). Once the operations from S403 to S407 are performed for the combinations of the single item stored in the comparison source attribute DB 19 and all items stored in the comparison destination attribute DB 20 (Yes at S408), the comparison table generating unit 32a determines whether the operations from S402 to S408 are performed for all items in the comparison source attribute DB 19 (S409).

The comparison table generating unit 32a repeats the abovementioned operations until the operations from S402 to S408 are performed for all items in the comparison source attribute DB 19 (No at S409).

Once the operations from S402 to S408 are performed for all items in the comparison source attribute DB 19 (Yes at S409), then the edit distance calculating unit 32b calculates edit distances between the items stored in the comparison source attribute DB 19 and the comparison destination attribute DB 20, and stores the edit distances in the comparison result DB 21 (S410).

Then, the common candidate extracting unit 32c refers to the information stored in the comparison result DB 21 and stored in the weight rule DB 16, and combines weights with respect to the comparison result DB 21 (S411). Subsequently, the common candidate extracting unit 32c calculates the degree of resemblance among each item stored in the comparison source attribute DB 19 and each item stored in the comparison destination attribute DB 20 (S412).

Then, regarding each item stored in the comparison source attribute DB 19; the common candidate extracting unit 32c stores, in the common candidate DB 22, the common candidates that are sorted according to descending order of degrees of resemblance of the items stored in the comparison destination attribute DB 20 (S413).

In this way, according to the second embodiment, it becomes possible to prevent an increase in the processing time taken for determining resembling candidates that may increase depending on the number of data items.

While analyzing from the management standpoint, it is not sufficient to integrate only those resembling items such as "order receiving entity" and "valued customer" which are clearly visible to human eye. For example, regarding seemingly unrelated items such as "business trip destinations" specified in a business trip report and "customer names" specified in sales summary data, if resemblance can be determined among the data included therein, then analysis can be performed by associating "business trip frequency" and "sales to customer". Thus, by associating sets of data from the management standpoint, there is also a possibility of giving new meaning to the data.

In that regard, the resemblance determining apparatus 10 according to the second embodiment calculates degrees of resemblance not by comparing the item names or the strings as is common practice but by referring to the data types identified from the character code distributions of the data belonging to the items. As a result, in addition to excluding items from candidates for resemblance determination depending on the degrees of resemblance, the resemblance determining apparatus 10 according to the second embodiment can also exclude, from candidates for resemblance determination, the comparison destination items being remotely associated to the comparison source items. Hence, as compared to the conventional case of attempting to extract items of a high degree of resemblance, it becomes possible to prevent ineffectual narrowing down of resembling items. As a result, in the case of performing data integration from the management standpoint as described above, it proves useful to extract items that not only have resemblance therebetween but also have strong association.

Moreover, since the language in which the data is written can be automatically estimated, it becomes possible to utilize the data efficiently in systems handling multilingual data such as systems of multinational businesses or cloud systems or in a situation of performing machine translation of all data into English according to a language identification result.

[c] Third Embodiment

Meanwhile, although the present invention has been described with reference to the abovementioned embodiments, it is also possible to implement the invention in various forms other than the abovementioned embodiments. In the following description, other embodiments of the present invention are described.

Method of Calculating Degree of Resemblance

For example, in the embodiments described above, the explanation is given for an example in which the degrees of resemblance are calculated by comparing the items stored in the comparison source DB 17 with the items stored in the comparison destination DB 18. However, that is not the only possible case. Alternatively, for example, regarding the items that are determined to have the same data type, the resemblance determining apparatus 10 can generate a comparison table, calculate edit distances, and extract common candidates. That enables achieving reduction in the operations among items having different data types. As a result, the processing load on a server can be reduced. Meanwhile, in the information stored in the databases illustrated in FIG. 4 to FIG. 11; numerical values, items, crosschecking methods are not limited to those illustrated in the drawings.

Application Example

In the embodiments described above, the operations are explained as the preprocessing prior to name identification operation during database integration. However, that is not the only possible case. For example, while creating a new database or a new system, quantifying of data attributes and data can be put into practice at various opportunities such as at the time of transferring existing system to a cloud system. As a result, at the timing of actually determining the degrees of resemblance, the calculation thereof can be performed using the pre-specified data attributes or the quantified data.

Network

Figure 16:
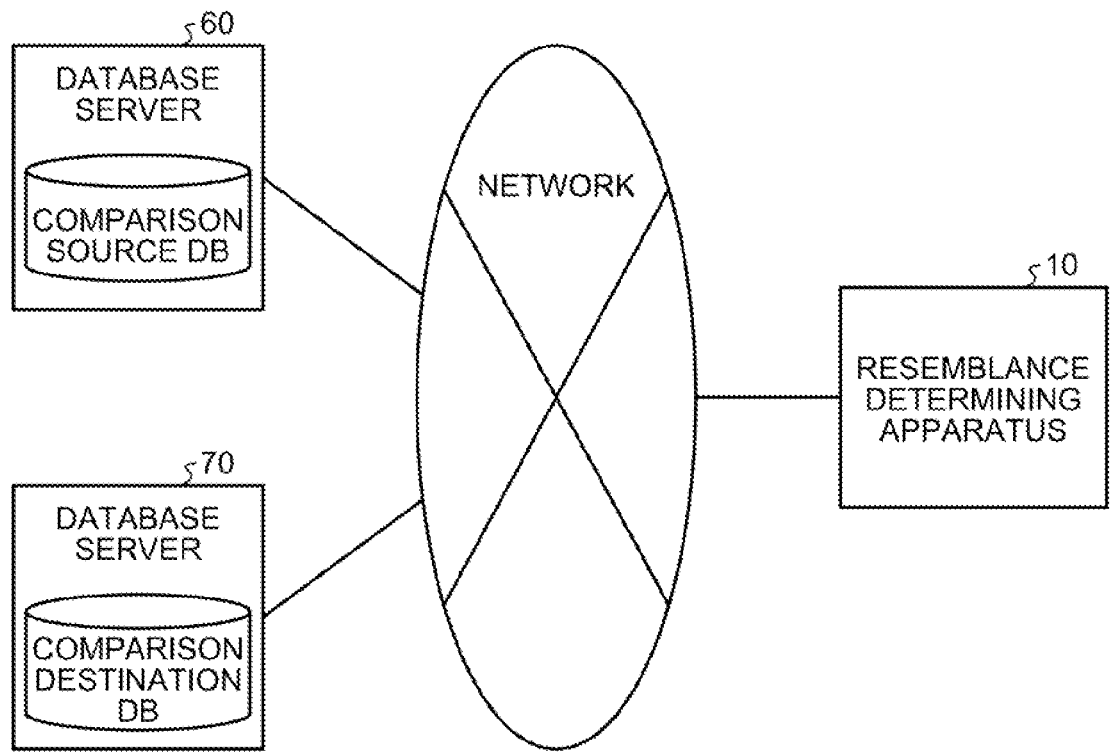
FIG. 16 is a diagram illustrating an exemplary system in which resemblance determination is performed via a network.

For example, in the embodiments described above, the explanation is given for an example in which a comparison source database and a comparison destination database are incorporated in the resemblance determining apparatus 10. However, that is not the only possible case. Alternatively, for example, either one or both of those databases can also be retrieved via a network. FIG. 16 is a diagram illustrating an exemplary system in which resemblance determination is performed via a network. As illustrated in FIG. 16, a database server 60 including a comparison source DB, a database server 70 including a comparison destination DB, and the resemblance determining apparatus 10 including the same operating units as illustrated in FIG. 3 are connected in a mutually communicable manner via a network. In such a configuration, the resemblance determining apparatus 10 can be configured to receive items and data from the database server 60 and from the database server 70, and perform the operations explained with reference to FIG. 12 to FIG. 15.

System

Processing described in the present embodiment as performed automatically may manually be performed wholly or partially. Conversely, all or a portion of processing described as performed manually may automatically be performed by a publicly known method. In addition, processing procedures, control procedures, and concrete names described in the above document or drawings may arbitrarily be changed if not specifically mentioned.

The constituent elements of the device illustrated in the drawings are merely conceptual, and need not be physically configured as illustrated. The constituent elements, as a whole or in part, can be separated or integrated either functionally or physically based on various types of loads or use conditions. The process functions performed by the device are entirely or partially realized by the CPU or computer programs that are analyzed and executed by the CPU, or realized as hardware by wired logic.

Program

The various operations described in the abovementioned embodiments can be implemented by executing a program written in advance in a computer system such as a personal computer (PC) or a workstation. The program can be distributed over a network such as the Internet. Explained below is an example of a computer system that executes a program having the same functions as the functions described in the abovementioned embodiments.

Figure 17:
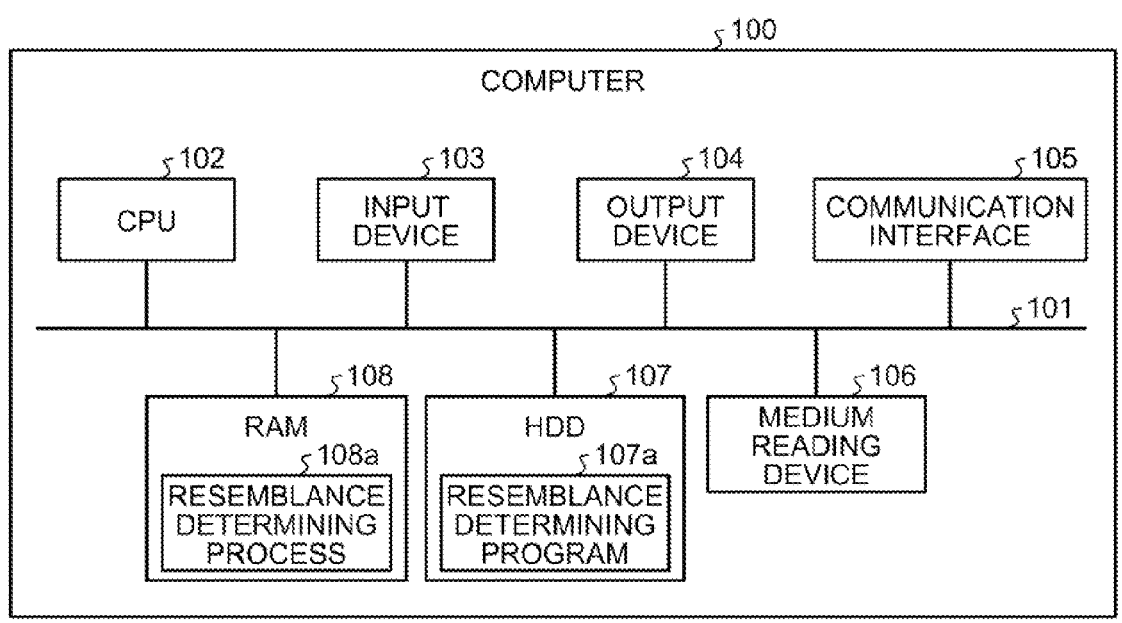
FIG. 17 is a diagram illustrating an exemplary hardware configuration of a computer that executes a resemblance determining program.

FIG. 17 is a diagram illustrating an exemplary hardware configuration of a computer that executes a resemblance determining program. As illustrated in FIG. 17, a computer 100 includes a CPU 102, an input device 103, an output device 104, a communication interface 105, a medium reading device 106, a hard disk drive (HDD) 107, and a random access memory (RAM) 108. A bus 101 interconnects all of the abovementioned constituent elements.

The input device 103 represents a mouse or a keyboard; while the output device 104 represents a display. The communication interface 105 represents an interface such as a network interface card (NIC). The HDD 107 stores therein a resemblance determining program 107a as well as all the databases illustrated in FIG. 3. Instead of using the HDD 107 as the exemplary recording medium, it is also possible to store various programs in a computer-readable recording medium such as a read only memory (ROM), a RAM, or a compact disk read only memory (CD-ROM), and the computer can be configured to read those programs from the recording medium. Alternatively, a recording medium having programs stored therein can also be placed at a remote location, and the computer can be configured to obtain the programs by accessing the recording medium. At that time, the obtained programs can be stored in a recording medium installed in the computer.

The CPU 102 reads the resemblance determining program 107a and loads it in the RAM 108 so as to run a resemblance determining process 108a that performs the same functions as the functions explained with reference to FIG. 3. That is, the resemblance determining process 108a performs the same functions as the functions performed by the quantifying unit 31a, the data type determining unit 31b, the comparison table generating unit 32a, the edit distance calculating unit 32b, and the common candidate extracting unit 32c. In this way, by reading and executing the programs, the computer 100 functions as an information processing apparatus that implements a resemblance determining method.

For example, in the computer 100, a resemblance determining program read by the medium reading device 106 from a recording medium is executed so as to perform the same functions as the functions described above in the embodiments. Meanwhile, the program mentioned herein in the other embodiments is not limited to be executed by the computer 100. For example, even in the case when another computer or a server executes the program or in the case when another computer and a server execute the program in tandem, the present invention is applicable as it is.

According to an aspect of the present invention, it becomes possible to prevent an increase in the processing time taken for determining resembling candidates.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A resembling candidate extracting method comprising:
   determining a character code range to which each of a plurality of character code belongs;
   identifying, when any one of the plurality of character code for which the character code range are determined is selected, first character data that includes character data of which a character code belongs to a different character code range than the character code range corresponding to the selected character code; and
   extracting second character data excluding the first character data from among the plurality of character data, as candidates for character data including a first attribute corresponding to the selected character code, wherein the resembling candidate extracting method further comprises:
   first calculating that includes separating data corresponding to each of the plurality of character code for which the character code range is determined and includes calculating at least one of a maximum character data length that represents the maximum data length of characters constituting the data, an average character data length that represents the average data length of characters constituting the data, a NULL probability that represents the NULL ratio in the data, a unique count that represents the number of non-overlapping characters from among the characters constituting the data, and a degree of discretion that represents the unique count ratio in the number of characters constituting the data; and
   second calculating a degree of resemblance among character data extracted as the second character data by referring to corresponding maximum character data lengths, corresponding average character data lengths, corresponding NULL probabilities, corresponding unique counts, and corresponding degrees of discretion.

2. The resembling candidate extracting method according to claim 1, wherein the determining includes determining, when the any one of the plurality of character code belongs to two or more character code ranges from among the plurality of ranges, that the character code belongs to a narrower character code range.

3. The resembling candidate extracting method according to claim 1, wherein the extracting includes selecting the plurality of character code in which the character code range were determined one by one in sequence and extracting candidates for character data including the first attribute corresponding to each selected character code.

4. The resembling candidate extracting method according to claim 1, wherein the second calculating includes multiplying a predetermined weight to each of the corresponding maximum character data lengths, the corresponding average character data lengths, the corresponding NULL probabilities, the corresponding unique counts, and the corresponding degrees of discretion calculated at the calculating, and calculating a degree of resemblance by referring to multiplication results.

5. The resembling candidate extracting method according to claim 1, wherein the second calculating includes calculating an edit distance between item names that represent names of the candidates for character data including a first attribute, and calculating a degree of resemblance by further referring to the edit distance.

6. The resembling candidate extracting method according to claim 1, wherein the identifying includes identifying the first character data by referring to a correspondence table in which a data type is specified in a corresponding manner to a character code range belonging to the data type.

7. A non-transitory computer-readable storage medium storing a program for processing a resembling candidate extracting, the program causing a computer to execute:
   determining a character code range to which each of a plurality of character code belongs;
   identifying, when any one of the plurality of character code for which the character code range are determined is selected, first character data that includes character data of which a character code belongs to a different character code range than the character code range corresponding to the selected character code; and
   extracting second character data excluding the first character data from among the plurality of character data, as candidates for character data including a first attribute corresponding to the selected character code, wherein the program causes the computer to further execute:
   first calculating that includes separating data corresponding to each of the plurality of character code for which the character code range is determined and includes calculating at least one of a maximum character data length that represents the maximum data length of characters constituting the data, an average character data length that represents the average data length of characters constituting the data, a NULL probability that represents the NULL ratio in the data, a unique count that represents the number of non-overlapping characters from among the characters constituting the data, and a degree of discretion that represents the unique count ratio in the number of characters constituting the data; and
   second calculating a degree of resemblance among character data extracted as the second character data by referring to corresponding maximum character data lengths, corresponding average character data lengths, corresponding NULL probabilities, corresponding unique counts, and corresponding degrees of discretion.

8. A resembling candidate extracting apparatus that is connected to a database server including a database via a network, the resembling candidate extracting apparatus comprising:
   a processor; and
   a memory, wherein the processor executes:
   determining a character code range to which each of a plurality of character code belongs;
   identifying, when any one of the plurality of character code for which the character code range are determined is selected, first character data that includes character data of which a character code belongs to a different character code range than the character code range corresponding to the selected character code; and
   extracting second character data excluding the first character data from among the plurality of character data, as candidates for character data including a first attribute corresponding to the selected character code, wherein the processor further executes:
   first calculating that includes separating data corresponding to each of the plurality of character code for which the character code range is determined and includes calculating at least one of a maximum character data length that represents the maximum data length of characters constituting the data, an average character data length that represents the average data length of characters constituting the data, a NULL probability that represents the NULL ratio in the data, a unique count that represents the number of non-overlapping characters from among the characters constituting the data, and a degree of discretion that represents the unique count ratio in the number of characters constituting the data; and
   second calculating a degree of resemblance among character data extracted as the second character data by referring to corresponding maximum character data lengths, corresponding average character data lengths, corresponding NULL probabilities, corresponding unique counts, and corresponding degrees of discretion.

* * * * *